US007924177B2

(12) United States Patent
Lai et al.

(10) Patent No.: US 7,924,177 B2
(45) Date of Patent: *Apr. 12, 2011

(54) DISTRIBUTED ON-DEMAND MEDIA TRANSCODING SYSTEM AND METHOD

(75) Inventors: Angela C. W. Lai, Mountain View, CA (US); James Peter Hoddie, Menlo Park, CA (US); Howard E. Chartock, Los Altos, CA (US); Christopher V. Pirazzi, Menlo Park, CA (US); Steve H. Chen, Santa Clara, CA (US); Jody Shapiro, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/074,393

(22) Filed: Mar. 4, 2008

(65) Prior Publication Data
US 2008/0231480 A1 Sep. 25, 2008

Related U.S. Application Data

(63) Continuation of application No. 11/825,705, filed on Jul. 9, 2007, now Pat. No. 7,355,531, which is a continuation of application No. 10/644,602, filed on Aug. 20, 2003, now Pat. No. 7,242,324, which is a continuation-in-part of application No. 10/465,805, filed on Jun. 20, 2003, now Pat. No. 6,888,477, which is a continuation of application No. 10/141,966, filed on May 10, 2002, now Pat. No. 6,593,860, which is a continuation of application No. 09/742,294, filed on Dec. 22, 2000, now Pat. No. 6,407,680.

(51) Int. Cl.
*H03M 7/34* (2006.01)
(52) U.S. Cl. ...... 341/51; 709/219; 709/231; 375/E7.198
(58) Field of Classification Search ............. 341/50–90; 709/247, 226, 218, 217, 206, 219, 231, 246, 709/203; 375/240.12, E7.198; 726/27; 725/31
See application file for complete search history.

(56) References Cited

U.S. PATENT DOCUMENTS

| 3,394,352 A | 7/1968 | Wernikoff et al. |
| 3,913,093 A | 10/1975 | De Vincentiis et al. |
| 3,937,881 A | 2/1976 | Hawkes |

(Continued)

FOREIGN PATENT DOCUMENTS
EP  1 026 872  8/2000
(Continued)

OTHER PUBLICATIONS

"Broadcast Help," [retrieved Aug. 20, 2002] at http://help.yahoo.com/help/us/bcst/, 2 pages.

(Continued)

*Primary Examiner* — Lam T Mai
(74) *Attorney, Agent, or Firm* — Frommer Lawrence & Haug LLP; William S. Frommer; Ellen Marcie Emas

(57) ABSTRACT

A method for delivering media content over a network includes transcoding the media content to generate multiple copies of the media content, each of the multiple copies having a different destination type or a different source type or both, storing the multiple copies in a cache, receiving requests for the media content, and selecting and delivering a copy of one of the multiple copies in response to each of the requests. A further method for providing media content transcoding services includes fetching media content, selecting one of multiple transcoders for transcoding from multiple source types to multiple destination types, wherein the one transcoder is selected based at least on the destination type, sending the media content to the selected transcoder, transcoding the media content to the destination type, thereby generating transcoded media content, and transmitting the transcoded media content.

15 Claims, 14 Drawing Sheets

U.S. PATENT DOCUMENTS

| | | | |
|---|---|---|---|
| 5,526,397 | A | 6/1996 | Lohman |
| 5,657,015 | A | 8/1997 | Nakajima et al. |
| 5,796,829 | A | 8/1998 | Newby et al. |
| 5,818,933 | A | 10/1998 | Kambe et al. |
| 5,838,927 | A | 11/1998 | Gillon et al. |
| 5,848,134 | A | 12/1998 | Sekiguchi et al. |
| 5,920,354 | A | 7/1999 | Fedele |
| 5,949,876 | A | 9/1999 | Ginter et al. |
| 5,991,795 | A | 11/1999 | Howard et al. |
| 6,058,107 | A | 5/2000 | Love et al. |
| 6,058,143 | A | 5/2000 | Golin |
| 6,122,290 | A | 9/2000 | Kawamata |
| 6,215,824 | B1 | 4/2001 | Assuncao |
| 6,247,050 | B1 | 6/2001 | Tso et al. |
| 6,339,450 | B1 | 1/2002 | Chang et al. |
| 6,407,680 | B1 * | 6/2002 | Lai et al. ............ 341/50 |
| 6,421,733 | B1 | 7/2002 | Tso et al. |
| 6,593,860 | B2 | 7/2003 | Lai et al. |
| 6,888,477 | B2 * | 5/2005 | Lai et al. ............ 341/50 |
| 7,242,324 | B2 * | 7/2007 | Lai et al. ............ 341/51 |
| 7,355,531 | B2 * | 4/2008 | Lai et al. ............ 341/51 |

FOREIGN PATENT DOCUMENTS

| | | |
|---|---|---|
| JP | 9 16487 | 1/1997 |
| JP | 10 326244 | 12/1998 |
| JP | 11 134227 | 5/1999 |
| JP | 11 296426 | 10/1999 |
| JP | 2000 165436 | 6/2000 |
| WO | WO 98 43177 | 10/1998 |
| WO | WO 98/43177 | 10/1998 |

OTHER PUBLICATIONS

"BrowserHawk features and benefits," [retrieved Jan. 23, 2004] at http://www.cyscape.com/products/bhawk/features.asp, 6 pages.

"Yahoo! Broadcast," [retrieved Aug. 20, 2002] at http://broadcast.yahoo.com/home.html, 3 pages.

"Larry Bouthillier's Streaming Media Player Detection Tutorial—Client-side code," [retrieved Sep. 20, 2002] at http://www.emediacommunications.biz/sm5/sm5_clientcode.html, 4 pages.

"Streaming Media Player/Connection Speed Detection Tutorial," [retrieved Sep. 20, 2002] at http://www.emediacommunications.biz/sm5/index.html, 2 pages.

A flowchart, [retrieved Sep. 20, 2002] at http://www.emediacommunications.biz/sm5/playDetectFlow.gif, 1 page.

A flowchart, [retrieved Sep. 20, 2002] at http://www.emediacommunications.biz/sm5/playerDataObjectUML.gif, 1 page.

Rakesh Mohan et al., Content Adaptation Framework: Bringing the Internet to Information Appliances (IBM), Multimedia Services and Technology Issues, Global Telecommunications Conference—Globecom '99, pp. 2015-2021.

Richard Han et al., Dynamic Adaptation in an Image Transcoding Proxy for Mobile Web Browsing (IBM), IEEE Personal Communications, Dec. 1998, pp. 8-17.

Chapman, Nigel et al., "Digital Multimedia," John Wiley & Sons, Ltd., Copyright 2000.

Murray, James D. et al., "Encyclopedia of Graphics File Formats: Second Edition," O'Reilly & Associates, Inc., Copyright 1994, 1996.

National Technical Report, vol. 42, No. 5 (Oct. 18, 1996), pp. 53-59, "Internet, Fax, Telephone Connection System". (English translation).

Notice of Rejection in Japan.

Katashi Nagao, Contents are converted appropriately in conformity to every apparatus, Nikkei Electronics, No. 770, Nikkei BP, May 22, 2000, 165-176.

* cited by examiner

| PUBLISHING VARIABLES | SOURCE TYPE 710 | DESTINATION TYPE 750 | DESTINATION TYPE 760 |
|---|---|---|---|
| PHYSICAL MEDIUM | LOCAL DISK | INTERNET | WIRELESS NETWORK |
| COMMUNICATION PROTOCOL | FILE I/O | WINDOWS MEDIA STREAMING MMS PROTOCOL | HTTP |
| CONTAINER FORMAT | MP3 | WINDOWS MEDIA | MP3 |
| ENCODING BIT RATE | 128 kpbs | 56 kbps | 12 kbps |

FIG. 7

STEADY CACHE TRANSFER BALANCING

| ON-PEAK CACHING OPERATION | OFF-PEAK CACHING OPERATIONS |
|---|---|
| •CACHE AND STREAM REQUESTED CONTENT<br><br>•PULL RECORDS FROM PRE-CACHE ARCHIVE<br><br>•STREAM PRE-CACHE RECORDS | •CACHE AND STREAM REQUESTED CONTENT<br><br>•PRE-CACHE ANTICIPATED AND/OR PRE-ORDER CONTENT<br><br>•STORE PRE-CACHE RECORDS INTO PRE-CACHE ARCHIVE |

DISTRIBUTED ON-DEMAND MEDIA TRANSCODING SYSTEM AND METHOD

PRIORITY

This is a continuation of application Ser. No. 11/825,705, filed Jul. 9, 2007, now U.S. Pat. No. 7,355,531 which is a continuation of application Ser. No. 10/644,602, filed Aug. 20, 2003, now U.S. Pat. No. 7,242,324, which is a continuation-in-part of application Ser. No. 10/465,805, filed Jun. 20, 2003, now U.S. Pat. No. 6,888,477, which is a continuation of Ser. No. 10/141,966 U.S. Pat. No. 6,593,860, filed May 10, 2002, which is a continuation of Ser. No. 09/742,294 U.S. Pat. No. 6,407,680, filed Dec. 22, 2000.

BACKGROUND OF THE INVENTION

1. Field of the Invention

The present invention relates to a system and method for transcoding information. More specifically, the present invention relates to a system and method for transcoding media content.

2. Related Art

The rapid publication of media content has been sought throughout human history. Publishers strive to deliver media content faster to larger audiences. As used herein, the term "media content" refers to any information, including audio, video, data, ideas, images, story, sound, text, or other content, that is perceived by one or more human senses.

The digital representation of media content combined with computing and networking technologies now provide a powerful way to publish. According to this new mode of publishing, networking technology permits the delivery of digitized media content over a network to end user computers. Communication protocols define how the digitized media content is exchanged over the network. A media player runs on the end user computer to allow the user to play or otherwise experience the media content.

Digital representations of media content come in different types. These types are generally defined according to a series of publishing variables which can include, but are not limited to, the file format, bit rate, communication protocol(s), physical medium, compression algorithm, and/or digital rights management information associated with the media content. The type of digitized media content which is used will depend upon a number of factors, such as, the computing and/or networking technology used in the process of publishing and the nature of the content itself.

For example, many types of digitized media content are defined according to a file format. Common file formats include QUICK TIME, MPEG, AVI, MP3, REAL, WINDOWS MEDIA, H.263 video coding, and PALM-compatible formats. A format can define media content as a file or in a data stream. See, for example, the graphics file formats and other formats described by J. D. Murray and W. vanRyper, The Encyclopedia of Graphics File Formats, Second Edition (O'Reilly & Associates, Inc.: Sebastopol, Calif.), 1996, which is incorporated in its entirety herein by reference.

Digitized media content types can also be categorized according to the type of encoding or compression technique that is used to reduce the physical size of the media content, or according to the type of physical medium that supports the storage of the media content. Different kinds of physical medium are used in publishing media content, such as magnetic or optical storage devices, memory devices, and wireless mediums.

Digitized media content types may also be categorized by the type of communication protocol or protocols used to transmit the media content. In packet-switched networks such as the Internet, many layers of protocols are used. Such protocols can include network and transport protocols and application protocols. Network and transport protocols are in part responsible for delivering packets of digital data. Examples of network and transport protocols are Internet Protocol (IP), Transmission Control Protocol (TCP), User Datagram Protocol (UDP), and Real-Time Transport Protocol (RTP). Application protocols are higher level protocols that run on top of the network and transport protocols. Among other things, application protocols provide services that support digital media publishing. Examples of application protocols used in World Wide Web technology are HyperText Transport Protocol (HTTP) and Real-Time Streaming Protocol (RTSP).

The emergence of a fast-growing number of media players has created a widening gap between the richness of the various types of media content and the diverse capabilities of the client devices to handle the content. As a result, the technology selection process for the end user has become quite complicated. For example, the user often cannot be certain that a given media player will be able to play the type of media content in which he or she is interested. Also, the user may be required to frequently download new media playing software in order to access desired content.

Furthermore, because users employ a wide variety of client media players, content providers are required to publish original media content in a number of source types in order to deliver the content to a large number of users. Content providers with archived media content also face a burden of having to publish archived media content into new or updated source types.

Transcoders convert certain types of media content (source type) to another type of media content (destination type). This conversion is known as "transcoding." Transcoding can involve a number of different conversion operations. The particular conversion operations used depend upon what publishing variables are being converted. For example, transcoding can involve a conversion operation from one encoded data format to another encoded data format (such as, converting CCITT Group 3 encoded data to RLE-encoded data.) See, Murray and vanRyper, p. 1095.

Conventional multi-type transcoding services are provided off-line, before the content provider publishes media content, adding an undesirable and unavoidable delay to the publishing process. Although arrangements for the real-time transcoding of media content are known, (e.g., transcoding and delivery of live media events over the Internet), these arrangements are limited in that they only allow for media content to be transcoded into a single destination type, and do not permit for the delivery of media content in multiple destination types.

Also, because off-line multi-format transcoding services are expensive, content providers can only afford to have their media content transcoded into a limited number of destination types. Users with media players incapable of accommodating the destination type of the transcoded files simply cannot access the content. Accordingly, conventional media production is limited to a "push" process in which content providers are forced to speculate about which media player users will employ to play their media files.

As a further result of this rapid development in media publishing technology, new internet and wireless device manufacturers must also invest heavily in the transcoding of media content so that a variety of content can be experienced on new media playing devices as new destination types. Thus, new internet and wireless device manufacturers experience the same setbacks and disadvantages from conventional transcoding schemes as described above.

SUMMARY OF THE INVENTION

A method for transcoding media content from a source type to a destination type is provided including fetching media content; selecting one of multiple transcoders for transcoding from multiple source types to multiple destination types, wherein the one transcoder is selected based at least on the destination type; sending the media content to the selected transcoder, transcoding the media content to the destination type, thereby generating transcoded media content; inserting a clip or trailer or both into the transcoded media content; and transmitting the transcoded media content including the clip or trailer or both.

A method for delivering media content over a network is also provided including transcoding the media content to generate multiple copies of the media content, each of the multiple copies having a different destination type or a different source type or both; storing the multiple copies in a cache; receiving requests for the media content; inserting a clip or trailer or both into the transcoded media content; and selecting and delivering a copy of one of the multiple copies including the clip or trailer or both in response to each of the requests.

A method for transcoding media content from a source type to a destination type is further provided including fetching media content; selecting one of multiple transcoders for transcoding from multiple source types to multiple destination types, wherein the one transcoder is selected based at least on the destination type; sending the media content to the selected transcoder; transcoding the media content to the destination type, thereby generating transcoded media content; downloading the transcoded media content to a destination of the destination type.

A method for delivering media content over a network is also provided including transcoding the media content to generate multiple copies of the media content, each of the multiple copies having a different destination type or a different source type or both; storing the multiple copies in a cache; receiving requests for the media content; and selecting and downloading a copy of one of the multiple copies in response to each of the requests.

A method for transcoding media content from a source type to a destination type is also provided fetching media content; selecting one of multiple transcoders for transcoding from multiple source types to multiple destination types, wherein the one transcoder is selected based at least on the destination type; automatically detecting one or more destination format criteria without end-user input; sending the media content to the selected transcoder; transcoding the media content to the destination type, thereby generating transcoded media content; and transmitting the transcoded media content.

A method for delivering media content over a network is also provided including transcoding the media content to generate multiple copies of the media content, each of the multiple copies having a different destination type or a different source type or both; storing the multiple copies in a cache; receiving requests for the media content; automatically detecting one or more destination format criteria without end-user input; selecting and delivering a copy of one of the multiple copies in response to each of the requests.

A method for transcoding media content from a source type to a destination type is also provided including fetching media content; selecting one of multiple transcoders for transcoding from multiple source types to multiple destination types, wherein the one transcoder is selected based at least on the destination type; sending the media content to the selected transcoder; transcoding the media content to the destination type, thereby generating transcoded media content; pre-caching the transcoded media content during an off-peak period; and transmitting the transcoded media content during an on-peak period.

A method for delivering media content over a network is further provided including transcoding the media content to generate multiple copies of the media content, each of the multiple copies having a different destination type or a different source type or both; storing the multiple copies in a cache; receiving requests for the media content; pre-caching the transcoded media content during an off-peak period; and selecting and delivering during an on-peak period a copy of one of the multiple copies in response to each of the requests.

A method for providing media content transcoding services is also provided including fetching media content; selecting one of multiple transcoders for transcoding from multiple source types to multiple destination types, wherein the one transcoder is selected based at least on the destination type; sending the media content to the selected transcoder; transcoding the media content to the destination type, thereby generating transcoded media content; transmitting the transcoded media content according to bandwidth criteria supplied to a media content service provider that performs the media content transcoding operation.

A method for providing media content transcoding services is further provided including fetching media content; selecting one of multiple transcoders for transcoding from multiple source types to multiple destination types, wherein the one transcoder is selected based at least on the destination type; sending the media content to the selected transcoder; transcoding the media content to the destination type, thereby generating transcoded media content; and transmitting the transcoded media content according to bandwidth criteria selected by a transcoding service provider that also performs the media content transcoding operation.

A method for delivering media content over a network is also provided including transcoding the media content to generate multiple copies of the media content, each of the multiple copies having a different destination type or a different source type or both; storing the multiple copies in a cache; receiving requests for the media content; and selecting and delivering a copy of one of the multiple copies in response to each of the requests according to bandwidth criteria selected by a transcoding service provider that also performs the media content transcoding operation.

A method for delivering media content over a network is further provided including transcoding the media content to generate multiple copies of the media content, each of the multiple copies having a different destination type or a different source type or both; storing the multiple copies in a cache; receiving requests for the media content; and selecting and delivering a copy of one of the multiple copies in response to each of the requests according to bandwidth criteria supplied to a media content service provider that performs the media content transcoding operation.

A method for providing media content transcoding services is also provided including fetching media content; selecting one of multiple transcoders for transcoding from multiple source types to multiple destination types, wherein the one transcoder is selected based at least on the destination type; sending the media content to the selected transcoder; transcoding the media content to the destination type, thereby generating transcoded media content; and transmitting the transcoded media content; and wherein the selected one of the multiple transcoders for transcoding from a source type to a destination type which have different: file formats of the media content; bit-rates of the media content; communication protocols according to which the media content is transferred; physical media on which the media content is stored; encoding formats; compression algorithms; or combinations thereof.

A method for delivering media content over a network is further provided including transcoding the media content to generate multiple copies of the media content, each of the multiple copies having a different destination type or a different source type or both; storing the multiple copies in a cache; receiving requests for the media content; and selecting and delivering a copy of one of the multiple copies in response to each of the requests, and wherein the different destination type or different source type or both of each of the multiple copies having different: file formats of the media content; bit-rates of the media content; communication protocols according to which the media content is transferred; physical media on which the media content is stored; encoding formats; compression algorithms; or combinations thereof.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings:

FIG. 7 is a table showing exemplary transcoding source types and destination types for various publishing variables according to an embodiment of the present invention.

Figure 1:
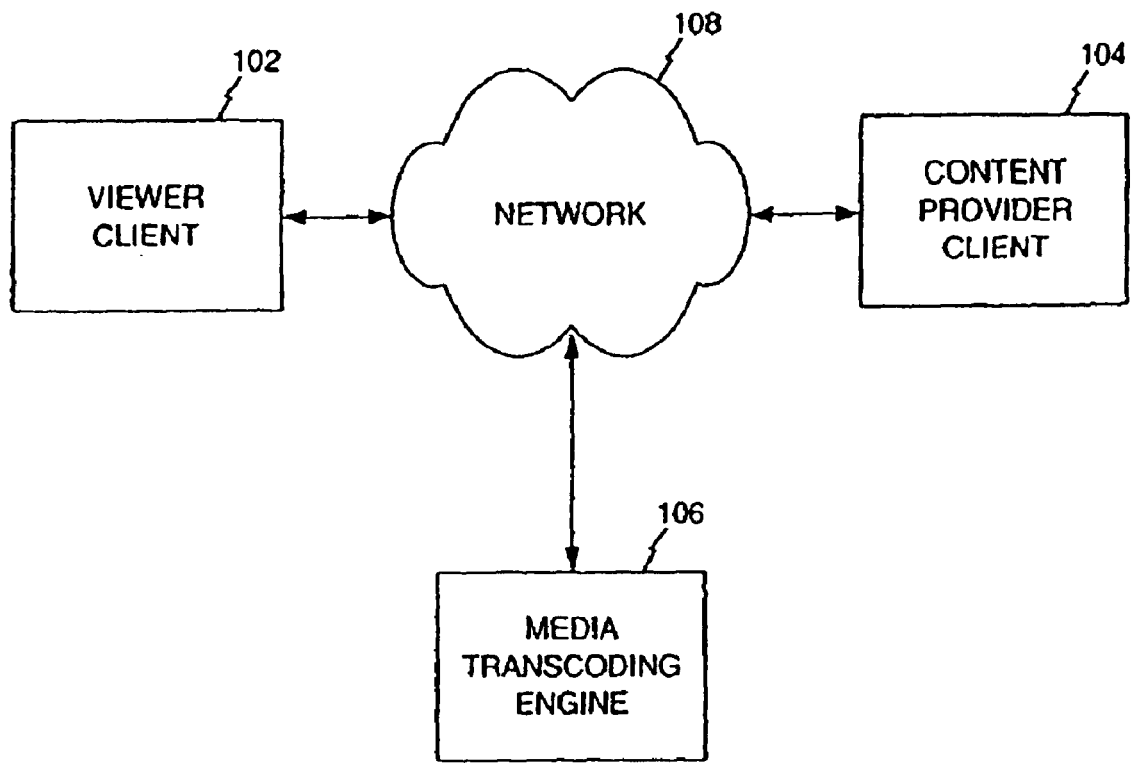
FIG. 1 is a block diagram of a media transcoding system according to one embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

INCORPORATION BY REFERENCE

What follows is a cite list of references each of which is, in addition to that which is described as background of the invention, the abstract and the invention summary, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description herein:

U.S. Pat. No. 3,394,352, issued July, 1968; U.S. Pat. No. 3,937,881, issued February, 1976; U.S. Pat. No. 5,657,015, issued August; 1997; U.S. Pat. No. 6,407,680, issued June, 2002; U.S. Pat. No. 6,466,939, issued Oct. 15, 2002; U.S. Pat. No. 5,928,330, issued Jul. 27, 1999; U.S. Pat. No. 6,317,134, issued Nov. 13, 2001; and U.S. Pat. No. 6,070,002, issued May 30, 2000; and United States published applications no. 2002/0093507, published May 15, 2003, 2002/0099858, published Jul. 25, 2002, and 2002/0099770, published Jul. 25, 2002, 2002/0091800, published Jul. 11, 2002; and U.S. patent application Ser. No. 10/076,090, filed Feb. 2, 2002; and Chapman, Nigel et al., "Digital Multimedia," John Wiley & Sons, Ltd., Copyright 2000 (Entire book provided); and Murray, James D. et al., "Encyclopedia of Graphics File Formats: Second Edition," O'Reilly & Associates, Inc., Copyright 1994, 1996 (Entire book provided).

DETAILED DESCRIPTION OF THE PREFERRED EMBODIMENTS

Table of Contents

A. Overview of the Invention
B. Operating Environment
C. Media Transcoding Engine of the Present Invention
D. Publishing of Media Content According to Embodiments of the Present Invention
E. Accessing Media Content According to Embodiments of the Present Invention
F. Further Transcoder Operation and Media Content Examples
G. Alternate Embodiments of the Present Invention
H. Conclusion A. Overview of the Preferred Embodiments A system and method in accordance with preferred embodiments includes systems and method for the on-demand transcoding of media information from a variety of source types into a variety of destination types. According to a preferred embodiment, in a system comprising a plurality of transcoders for transcoding from a plurality of source types to a plurality of destination types, a method is provided for transcoding media content from a source type to a destination type. The method includes receiving a transcoding request for the media content, fetching the media content, and sending the media content to a selected one of the plurality of transcoders. The transcoder is selected based on the source type and the destination type. The transcoder transcodes the media content from the source type to the destination type, thereby generating transcoded media content. The transcoded media content is then transmitted.

A media transcoding system in accordance with a preferred embodiment transcodes media content from a source type to a destination type. The transcoding system includes a network interface, a resource manager, a transmitting server, a streaming server, and a plurality of transcoders for transcoding from a plurality of source types to a plurality of destination types. The network interface receives a transcoding request for media content. The resource manager commands the transmitting server to fetch the media content. The resource manager further selects one of the plurality of transcoders based on the source type and destination type, and commands the selected transcoder to transcode the media content from the source type to the destination type to generate transcoded media content. The resource manager also commands the streaming server to transmit the transcoded media content.

In another embodiment, a method is provided for transcoding media content from a source type to a destination type, comprising the steps of receiving a transcoding request for the media content, fetching the media content, selecting one of a plurality of transcoders for transcoding from a plurality of source types to a plurality of destination types based on the source type and the destination type, sending the media content to the selected transcoder, transcoding the media content from the source type to the destination type, thereby generating a transcoded media file, and transmitting the transcoded media content.

In further embodiments, the media content may comprise either a file of digital information or a stream of digital data. In further embodiments, the media content is fetched, sent and transcoded as a stream of digital data, the transcoded media file is transmitted as a stream of digital data, and the fetching, sending, transcoding and transmitting are all performed in a pipelined fashion.

In further embodiments, the transcoding request is received over the Internet and the transcoded media content is transmitted over the Internet.

In further embodiments, the media content type is defined according to at least one publishing variable, wherein the publishing variable may be the file format of the media content, the bit-rate of the media content, the compression algorithm according to which the media content is stored, the communication protocol according to which the media content is transferred, or the physical medium on which the media content is stored, and the step of transcoding the media content comprises converting the publishing variable of the media content from a source publishing variable type to a destination publishing variable type.

A media transcoding system in accordance with a preferred embodiment transcodes media content from a source type to a destination type. The media transcoding system includes a network interface, a resource manager, a transmitting server, a streaming server; and a plurality of transcoders for transcoding from a plurality of source types to a plurality of destination types. The network interface is adapted to receive a transcoding request for the media content. The resource manager is adapted to respond to the transcoding request and, in response to the transcoding request, to command the transcoding server to fetch the media content, to select one of the plurality of transcoders based on the source type and the destination type, to command the selected transcoder to transcode the media content from the source type to the destination type, thereby generating transcoded media content, and to command the streaming server to transmit the transcoded media content.

In further embodiments, the media content may comprise a file of digital information or a stream of digital data.

In further embodiments, the transmitting server is adapted to fetch the media content as a data stream, the selected transcoder is adapted to transcode the media content as a data stream, and the streaming server is adapted to transmit the transcoded media content as a data stream. The resource manager manages the operation of the transmitting server, the selected transcoder, and the streaming server so that the fetching, transcoding and transmitting occur in a pipelined fashion.

In further embodiments, the network interface is adapted to receive the transcoding request over the Internet and the streaming server is adapted to transmit the transcoded media content over the Internet.

In further embodiments, the media content type is defined according to at least one publishing variable, wherein the publishing variable may be the file format of the media content, the bit-rate of the media content, the compression algorithm according to which the media content is stored, the communication protocol according to which the media content is transferred, or the physical medium on which the media content is stored, and the selected transcoder is adapted to convert the publishing variable of the media content from a source publishing variable type to a destination publishing variable type.

Systems and methods in accordance with preferred embodiments are advantageous in that they permit the transcoding of media content on demand from a single one or a variety of source types to a variety of destination types in a manner that is transparent to the content provider and the user. Systems and methods in accordance with preferred embodiments are also advantageous in that they permit the transcoding of media content stored in files on demand from a single source type or a variety of source types to a variety of destination types in a manner that is transparent to the content provider and the user.

Another advantage of systems and methods in accordance with preferred embodiments is that they permit the transcoding of live (i.e., streaming) media content on demand from a single source type to a variety of destination types in a manner that is transparent to the content provider and the user.

Another benefit of systems and methods in accordance with preferred embodiments is that they permit a user to play various types of media content regardless of the media player employed by the user.

Yet another benefit of systems and methods in accordance with preferred embodiments is that they obviate the need for a user to download a newer media player or upgrade an existing media player in order to access desired media content.

A further advantage of systems and methods in accordance with preferred embodiments is that they permit a content provider to provide original media content in a single source type to a large number of users using diverse media players that accept different media content types.

A further benefit of systems and methods in accordance with preferred embodiments is that they expedite the publishing process for media content providers by allowing them to publish media content without first employing off-line encoding services. Systems and methods in accordance with preferred embodiments minimize the time-to-market for the publication of media content.

Another benefit of systems and methods in accordance with preferred embodiments is that they create a lower barrier of entry to media publication by permitting content providers to out-source necessary transcoding tasks and to avoid investment in transcoding servers and other equipment necessary for transcoding.

Yet another benefit of systems and methods in accordance with preferred embodiments is that they permit content providers to deliver media content to users with media players incapable of accommodating the source type of the original media content.

A further advantage of systems and methods in accordance with preferred embodiments is that they may defer the transcoding of media content until the content is demanded by a user for a specific media player. Accordingly, content providers can avoid an unnecessary investment in the transcoding of original media content to types not requested by users.

Additional features and advantages of systems and methods in accordance with preferred embodiments will be set forth in the description that follows, and in part will be apparent from the description, or may be learned by practice of the systems and method described. Other advantages will be realized and attained by the systems and methods particularly pointed out in the written description and claims hereof as well as the appended drawings.

The systems and methods of the preferred embodiments will now be described in further detail with reference to FIGS. 1-11.

B. Operating Environment

FIG. 1 is a block diagram representing an example operating environment 100 of a transcoding system in accordance with a preferred embodiment. It should be understood that the example operating environment 100 is shown for illustrative purposes only and does not limit the invention. Other implementations of the operating environment described herein will be apparent to persons skilled in the relevant art(s) based on the teachings contained herein.

Referring to FIG. 1, example operating environment 100 includes a viewer client 102, a content provider client 104, a media transcoding engine 106, and a network 108. Only one viewer client 102 and content provider client 104 is shown for clarity. In general, any number of these components can be included in a transcoding system in accordance with a preferred embodiment.

The viewer client 102, the content provider client 104 and the media transcoding engine 106 are all connected via a network 108. The network 108 connects all the components of the system illustrated at FIG. 1, and can be any type of computer network or combination of networks including, but not limited to, circuit switched and/or packet switched networks, as well as wireless networks. In one example, the network 108 includes the Internet.

Any conventional communication protocol can be used to support communication between the components of the transcoding system 100. For example, a Transmission Control Protocol/Internet Protocol (TCP/IP) suite can be used to establish links and transport data and Real-Time Streaming Protocol (RTSP) can be used to stream data between components of the transcoding system 100. A World Wide Web-based application layer and browser (and Web server) can also be used to further facilitate communication between the components shown in FIG. 1. However, these examples are illustrative. The present invention is not intended to be limited to a specific communication protocol or application, and other proprietary or non-proprietary network communication protocols and applications can be used.

The viewer client 102 is used by a user, or viewer, to request and receive media content via the network 108, and to play received media content. In embodiments, the viewer client 102 is a personal computer that includes a Web browser and one or more media players running under the computer operating system. Alternately, the viewer client 102 can be a WEBTV, a WINDOWS CE device, a Personal Digital Assistant (PDA), a PALM handheld device, a console appliance with network access capability, an MP3 appliance, or any other client device and/or program capable of requesting, receiving and playing media content. However, the invention is not limited to these examples, and one skilled in the art will appreciate that a wide variety of client devices and programs can be used to request, receive and play media content via the network 108. The invention is directed to such other client devices and programs.

The viewer client 102 is capable of receiving and playing various types of media content. For example, the viewer client may receive and play media content in various well-known encoded formats including, but not limited to, MPEG, AVI, MP3, REAL, WINDOWS MEDIA, QUICK TIME, H.263 video coding, and PALM-compatible formats.

The content provider client 104 is used by the content provider to publish and/or transmit media content over the network 108. In embodiments, the content provider client 104 includes a client workstation and media input device and/or program. For example, the content provider client 104 may comprise a personal computer with an attached media input device. The content provider client 104 can provide media content using a variety of media input devices and programs. For example, media content can be provided using cameras (8 mm, Hi-8, or any video digitizing device), line-in/microphone (either attached to any of the camera devices, or stand-alone audio input devices), digital cameras, devices that upload slide shows with voice-over illustrations, files previously encoded in a client-chosen format, or files available via a network accessible mount point (such as, but not limited to, Hypertext Transfer Protocol (HTTP), File Transfer Protocol (FTP), or remote servers). These examples are not limiting, and one skilled in the art will appreciate that a wide variety of client devices and programs can be used to publish and/or transmit media content via the network 108, and that the invention is directed to such client devices and programs.

The content provider client 104 is capable of publishing and/or transmitting various types of media content. For example, the content provider client 104 can provide multi-media files in various well-known encoded formats including, but not limited to, MPEG, AVI, MP3, REAL, WINDOWS MEDIA, QUICK TIME, H.263 video coding, and PALM-compatible formats.

The media transcoding engine 106 acts as an intermediate between the content provider client 104 and the viewer client 102. As will be described in more detail below, the media transcoding engine 106 receives requests for media content from the viewer client 102 and obtains the requested media content from the content provider client 104. The media transcoding engine 106 then transcodes the media content received from the content provider client 104 from a source type to a destination type that can be accommodated by the viewer client 102 and delivers the transcoded media content to the viewer client 102. The media transcoding engine 106 performs the transcoding and delivery of the requested media content on-demand in a manner that is transparent to the content provider as well as the viewer of the media content.

In accordance with the present invention, because the media transcoding engine 106 can transcode media content into a variety of destination types, the content provider can provide media content using a single media input device and still deliver the content to viewers using a variety of different media players, each of which requires a different destination type. Additionally, the present invention permits users to access a variety of media content published in different source types no matter what media player they are using. The media transcoding engine 106 of FIG. 1 will now be described in more detail.

C. Media Transcoding Engine

Figure 2:
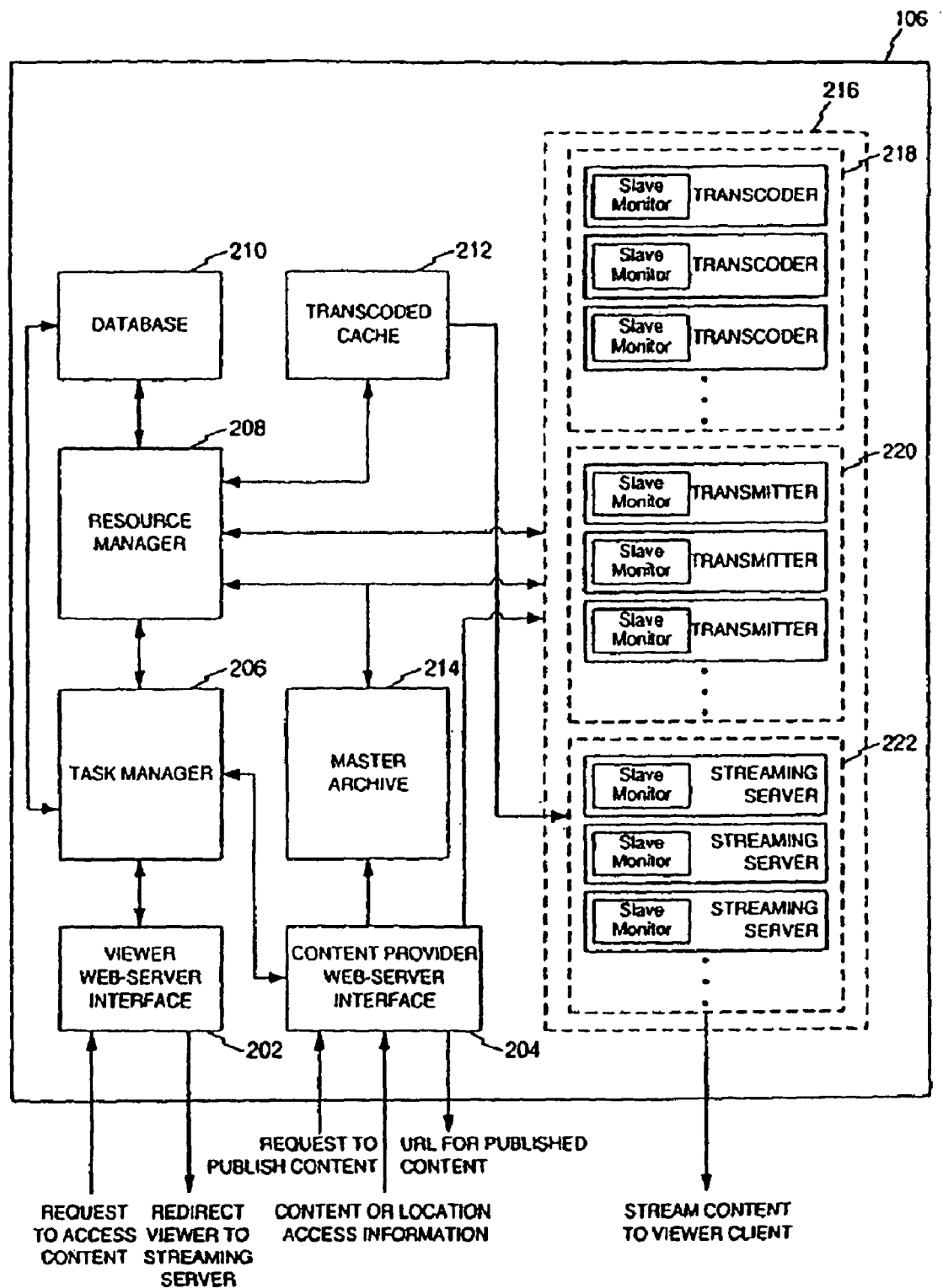
FIG. 2 is a block diagram of an example media transcoding engine according to one embodiment of the present invention.

FIG. 2 is a block diagram of the media transcoding engine 106 according to an embodiment of the present invention. The media transcoding engine 106 is comprised of a number of components including a viewer Web server interface 202, a content provider Web server interface 204, a task manager 206, a resource manager 208, a database 210, a transcoded cache 212, a master archive 214, a machine farm 216, and, within the machine farm 216, transcoder servers 218, transmitter servers 220, and streaming servers 222. The components of the media transcoding engine 106 are each operably connected to each other by an internal computer network represented, in part, by the arrows connecting the components in FIG. 2. The computer network can include one or more computer buses for connecting components co-existing on the same server, as well as any other type of communication infrastructure for connecting remote components including, but not limited to, circuit switched and/or packet switched networks, as well as wireless networks. In embodiments, the network connecting the components within the media transcoding engine 106 includes a local area network (LAN).

Each of the components of the media transcoding engine 106 will now be described. The content provider Web server interface 204 is a network interface between the media transcoding engine 106 and the content provider client 104 that permits a content provider to publish media content. The content provider Web server interface 204 receives and processes a request to publish media content from the content provider client 104. In embodiments, the content provider Web server interface 204 also receives the media content itself from the content provider client 104 for archival purposes within the media transcoding engine 106. Alternately, the content provider Web server interface 204 receives location and access information from the content provider client 104, which permits the media transcoding engine 106 to locate and fetch the media content at a later time for transcoding and/or delivery of the media content to a viewer.

In embodiments, the content provider can download a software tool or "plug-in" from the content provider Web server interface 204 that facilitates the delivery of media content from the content provider client 104 to the content provider Web server interface 204. The tool provides a configurable interface that resides on the content provider client 104 and permits the content provider to upload various types of media content to the content provider Web server interface 204.

After it receives the media content, or, alternately, the necessary location and access information for fetching the media content, the content provider Web server interface 204 returns address and source information to the content provider client 104. The address information points viewers who request the content provider's media content to the media transcoding engine 106 and the source information provides information concerning the source of the requested media content. As shown in FIG. 2, in embodiments of the present invention, the address and source information comprise a URL (Uniform Resource Locator) that points the viewer client to the media transcoding engine 106 and provides information to the media transcoding engine 106 about the source of the requested media content. Content providers can post the URL as a link on their Web-site, thereby allowing viewers who visit their Web-site to click on the URL in order to access the media content via the media transcoding engine 106.

The viewer Web server interface 202 is a network interface between the media transcoding engine 106 and the viewer client 102 that permits media content to be requested by and delivered to a viewer. The viewer Web server interface 202 receives and processes a request to access media content from the viewer client 102, thereby initiating the transcoding and delivery of the requested media content to the viewer client 102. Because transcoded media content is streamed to the viewer client 102 by a streaming server and/or proxy server as will be discussed in more detail herein, the viewer Web server interface 202 sends a reply to the viewer client 102 redirecting the viewer client 102 to the appropriate server from which to receive the requested media content.

The media transcoding engine 106 is adapted to deliver requested media content to the viewer client 102 in an optimal destination type. The optimal destination type for the viewer client 102 may be determined in a number of ways.

In embodiments, the viewer can download a software tool or "plug-in" from the viewer Web server interface 202 that facilitates the delivery of media content from the media transcoding engine 106 to the viewer client 102. The tool is a program that runs on the viewer client 102 and assists in determining the optimal destination type for the viewer client 102 to receive and play media content. In embodiments, the optimal destination type may be determined either by automatic tests run on the viewer client 102, or by requiring the viewer to provide system and preference information explicitly. The optimal destination type may then be stored by the software tool as a "cookie" on the viewer client 102 for future reference by the media transcoding engine 106.

Alternatively, the optimal destination type may be stored in a database within the media transcoding engine 106, and a "cookie" may be stored on the viewer client 102 that simply identifies the user. Then, when the media transcoding engine 106 is required to transcode media content for delivery the viewer client 102, it may read the cookie and map the identification of the user to the database to obtain the optimal destination type.

In further embodiments, the optimal configuration can be made adjustable for more sophisticated users, or may be updated periodically in case of network condition changes between the viewer client 102 and the network 108 (e.g., change of Internet Service Provider, or change of connection speed).

As described above, the content provider Web server interface 204 and the viewer Web server interface 202 each comprise network interfaces. In embodiments, the content provider Web server interface 204 and the viewer Web server interface 202 each comprise a Web server. In alternate embodiments, the content provider Web server interface 204 and the viewer Web server interface 202 each comprise a load-balancer that redirects requests to other physical Web servers (in other words, they are virtual Web servers).

The task manager 206 is a component of the media transcoding engine 106 that processes requests for media content received from the viewer Web server interface 202. The task manager determines whether the media transcoding engine 106 has all the information necessary to deliver the requested media content, gathers any missing information, and determines what tasks need to be executed to deliver the requested media content. The task manager then interacts with the resource manager 208 to execute the required tasks.

The resource manager 208 is a program that determines what resources are available within the media transcoding engine 106 to carry out the tasks necessary to deliver the requested media content (e.g., fetching and transcoding the requested media content), allocates the necessary tasks to the appropriate resources, and then manages the tasks to completion. In a sense, the resource manager 208 works like a traditional load balancer. However, whereas a traditional load balancer operates by managing a virtual machine consisting of a set of machines that perform separate and identical tasks, the resource manager distributes tasks that are often different and interdependent. The process by which the resource manager 208 distributes tasks and allocates resources will be described in more detail below.

Although FIG. 2 shows only one resource manager 208, it will be understood by one of ordinary skill in the relevant art(s) that alternate embodiments of the media transcoding engine 106 can include more than one resource manager for allocating tasks and resources within the media transcoding engine 106.

In embodiments, the task manager 206 and the resource manager 208 may be implemented as software running on one or more general purpose server(s) within the media transcoding engine 106.

The machine farm 216 includes a plurality of individual servers for performing the transcoding and delivery of requested media content within the media transcoding engine 106. The machine farm 216 includes transmitter servers 220 that fetch the source data for the requested media content, transcoder servers 218 that transcode the source data to the appropriate destination type, and streaming servers 222 that stream the transcoded media content to the viewer client 102 or to a proxy server for delivery to the viewer client 102.

The transmitter servers 220 run transmitter software that permits them to fetch the requested media content from a source location and transmit it to one of the transcoder servers 218, streaming servers 222, or a proxy server (not shown).

The transcoder servers 218 run transcoder software that permit them to transcode from a variety of known source types to a variety of known destination types. In embodiments, the machine farm 216 is implemented utilizing a plug-in architecture that permits new transcoding services to be added incrementally, thereby ensuring that the media transcoding engine 106 can accommodate new media types.

In alternate embodiments of the present invention, a single server may perform both the transmitter and transcoder functions. In further alternate embodiments, the transmitting of requested media content may be carried out by software external to the media transcoding engine 106. For example, the transmitting of requested media content may be executed by software residing on the content provider client 104.

In embodiments, each streaming server within the machine farm 216 is a type-specific streaming server dedicated to the delivery of media content of a single type. For example, a streaming server within the machine farm 216 may be dedicated to delivering transcoded media content in REAL format, WINDOWS MEDIA format, QUICK TIME format, etc. The streaming servers 222 within the machine farm may run off-the-shelf industry-standard streaming server programs, streaming server programs that are implemented according to a public standard, or proprietary streaming server programs.

In addition to streaming media content to the viewer client 102, the streaming servers 222 keep usage statistics pertaining to the media content being delivered as well as the destination types in which the media content is being delivered. The streaming servers 222 provide the usage statistics to the resource manager 208, thereby permitting the resource manager 208 to perform cache management functions within the media transcoding engine 106. For example, such usage statistics permit the resource manager 208 to cache the most frequently requested transcoded media content in the most frequently requested destination types. The caching of transcoded media content will be further described in regard to the transcoded cache 212, below.

In alternate embodiments, the tracking of usage statistics is carried out by an optional proxy server (not shown) that channels streaming media content from the streaming servers 222 to the viewer client 102. Such an implementation may be desired where the streaming servers 222 are not capable of tracking usage statistics.

As shown in FIG. 2, each server within the machine farm 216 includes a slave monitor that serves as an interface between the server and the resource manager 208. The slave monitor operates to receive tasks from the resource manager 208, to initialize the tasks within the server, and to report the status of initialized tasks, including the reporting of the failure or completion of an assigned task. By reporting the status of each task within a server, the slave monitor thereby permits the resource manager 208 to manage the execution of all the tasks within the media transcoding engine 106.

In an alternate embodiment, the slave monitor only initiates tasks received from the resource manager 208, and the tasks themselves report directly to the resource manager 208 rather than to the slave monitor.

The database 210 is used by the resource manager 208 to assist in managing tasks and resources within the media transcoding engine 106. The database 210 stores information concerning the status of each active and pending task as well as information concerning the status of each resource within the machine farm 216, thereby aiding the resource manager 208 in determining which resources are currently available to the resource manager 208 for executing necessary tasks.

The database 210 is also used by the task manager 206 to keep track of published media content archived within the media transcoding engine 106. The database 210 maintains source information about such published media content including the identity, source location, and source type of the media content, when available.

The database 210 can be implemented using any type of database structure known in the art for storing data, including, but not limited to, relational databases, object-oriented databases, flat-file databases or inverted-list databases. In embodiments, the database 210 can be stored on one or more general purpose servers, file servers, or network attached storage appliances internal to the media transcoding engine 106.

The master archive 214 is an archive within the media transcoding engine 106 that stores the original media content published by the content provider and received by the content provider Web server interface 204 from the content provider client 104. Also, where the media transcoding engine 106 is required to fetch original media content from a location outside the media transcoding engine 106, the media transcoding engine 106 can cache a copy of the original media content in the master archive 214. By caching a copy of the original media content in the master archive 214, the media transcoding engine 106 avoids having to fetch the original media content from outside the internal network of the engine when a subsequent request for the same media content is received.

The transcoded cache 212 is a cache within media transcoding engine 106. The transcoded cache 212 is used by the media transcoding engine 106 to store a copy of requested media content after it has been transcoded. When subsequent requests are received for the same media content in the same destination type, the media transcoding engine 106 delivers the content from the transcoded cache, thereby avoiding the expensive CPU overhead of repeatedly transcoding the same media content.

The resource manager 208 keeps track of what is cached within the master archive 214 and the transcoded cache 212 and manages the utilization of each cache using intelligent algorithms. In embodiments, the intelligent algorithm used by the resource manager 208 to manage the utilization of each cache is based on usage statistics received from the streaming servers 222 and/or optional proxy servers (not shown), as discussed above, regarding the frequency with which media content is requested in various destination types. For example, in embodiments, the resource manager 208 uses a Least-Recently-Used algorithm to determine whether a certain copy of media content should be retained within a cache or discarded. According to a Least-Recently-Used algorithm, a copy of media content is discarded if it has not met a predetermined threshold for a number of accesses in a given time. This example is not limiting and one skilled in the relevant art(s) will appreciate that any number of intelligent algorithms known in the art may be used to manage the utilization of the master archive 214 and the transcoded cache 212. Such intelligent algorithms are within the scope and spirit of the present invention.

In embodiments, the master archive 214 and/or the transcoded cache 212 are implemented as one or more network attached storage appliances coupled to the internal network within the media transcoding engine 106. However, the invention is not so limited, and any suitable storage device may be used to implement the master archive 214 and/or the transcoded cache 212, including but not limited to, general-purpose servers running caching software, file servers, one or more disk arrays, or a storage area network (SAN).

The methods by which media content is published and accessed according to preferred embodiments will now be described.

D. Publishing of Media Content According to Preferred Embodiments

In preferred embodiments, media content may be published either as an encoded file or delivered as a continuous stream of data, as in the case of a live audio or video feed.

Figure 3:
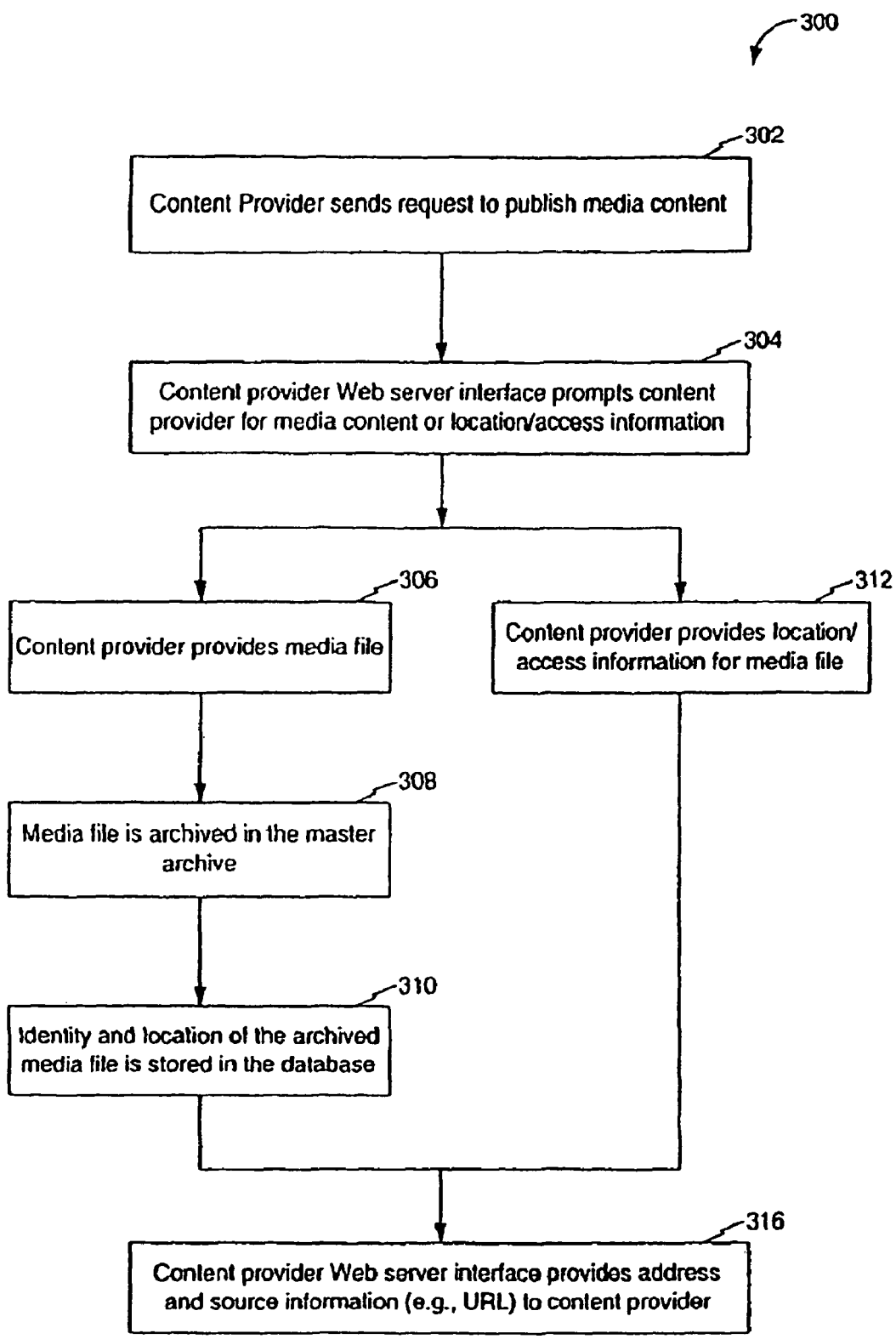
FIG. 3 is a flowchart that describes a routine for publishing media content according to an embodiment of the present invention.

FIG. 3 depicts a flowchart 300 of a method by which media content is published according to embodiments of the present invention wherein the media content is an encoded media file. The invention, however, is not limited to the description provided by the flowchart 300. Rather, it will be apparent to persons skilled in the art from the teachings herein that other functional flows are within the scope and spirit of the present invention.

In step 302, the content provider sends a request to publish content from the content provider client 104 to the content provider Web server interface 204. In embodiments, the request comprises an HTTP request.

In step 304, the content provider Web Server interface 204 sends a prompt to the content provider client 104 asking for the media content itself or the necessary location and access information to fetch the media content. As discussed above, according to embodiments of the present invention, the content provider can either archive media content within the media transcoding engine 106, or can store media content in an alternate location outside of the media transcoding engine 106, such as on the content provider's own server.

As shown in step 306, where the content provider wishes to store the encoded media file in an archive within the media transcoding engine 106, the content provider delivers the media file to the content provider Web server interface 204 via the content provider client 104. At step 308, after the content provider Web server interface 204 receives the encoded media file, it transmits the file to the master archive 214 for archival within the media transcoding engine 106. From the master archive 214, the encoded file is available to the resource manager 208 and other components of the media transcoding engine 106. At step 310, the identity and location of the archived file is reported by the content provider Web-Server interface 204 to the task manager 206, which stores the information within the database 210 for future reference. In embodiments, the source type of the archived file is also stored within the database 210 for future reference.

As shown in step 312, where the content provider wishes to store the encoded media file in an alternate location outside of the media transcoding engine 106, the content provider provides the location and access information necessary to fetch the encoded media file to the content provider Web server interface 204 via the content provider client 104.

At step 316, after receiving either the encoded media file or the location and access information necessary to fetch the encoded media file, the content provider Web server interface 204 provides the content provider client 104 with address and source information. The address information points viewers who request the content provider's media content to the media transcoding engine 106 and the source information provides information concerning the source of the requested media content. Where the encoded media file is stored in an alternate location outside of the media transcoding engine 106, the source information includes the location and access information provided by the content provider in earlier step 312.

In embodiments, the address and source information comprises a URL (Uniform Resource Locator) that points the viewer client 102 to the media transcoding engine 106 and provides information to the media transcoding engine 106 about the source of the requested media content. Content providers can post the URL as a link on their web-site, thereby allowing viewers who visit their web-site to click on the URL in order to access the media content via the media transcoding engine 106. After step 316, the flowchart 300 ends.

Figure 4:
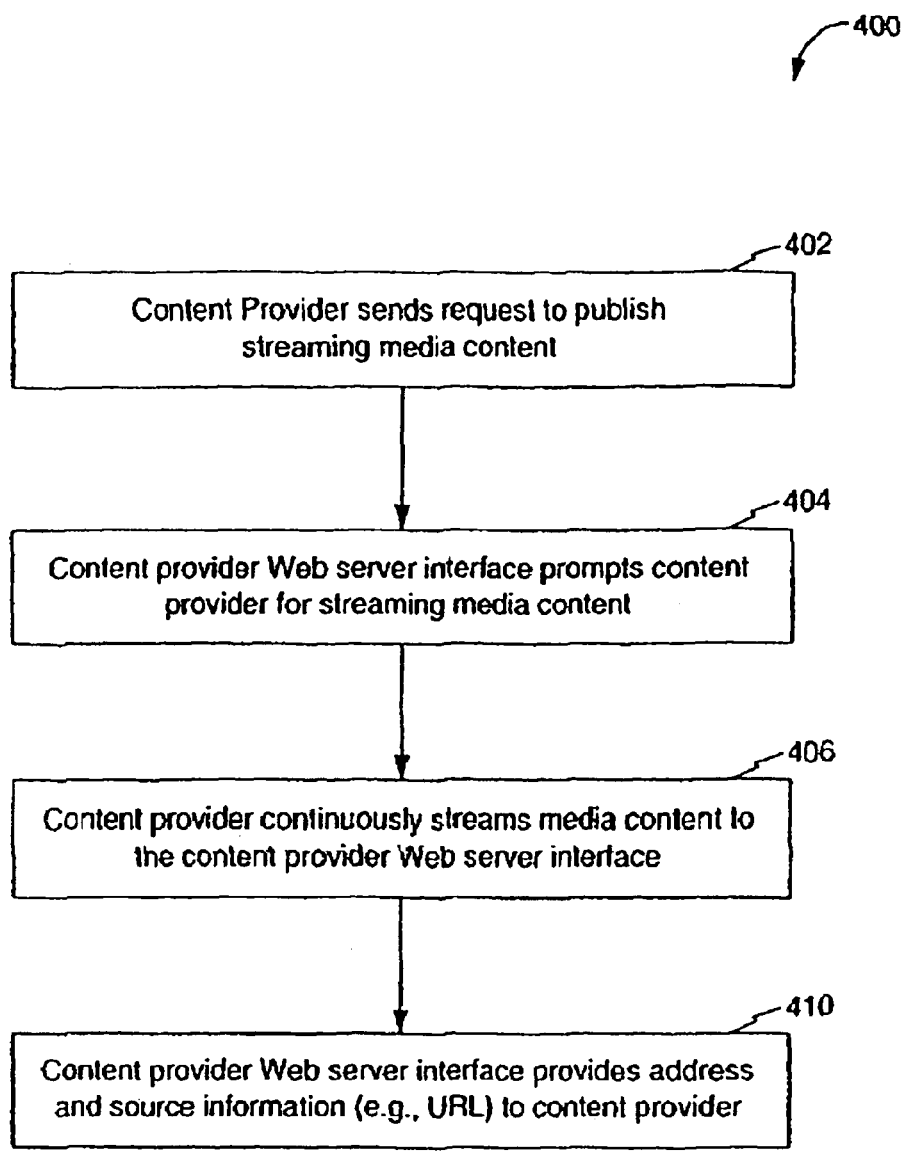
FIG. 4 is a flowchart that describes a routine for publishing media content according to an embodiment of the present invention.

FIG. 4 depicts a flowchart 400 of a method by which media content is published according to preferred embodiments wherein the media content is delivered as a continuous stream of data, as in the case of a live audio or video feed. The invention, however, is not limited to the description provided by the flowchart 400. Rather, it will be apparent to persons skilled in the art from the teachings herein that other functional flows are within the scope and spirit of the present invention.

In step 402, the content provider sends a request to publish streaming media content from the content provider client 104 to the content provider Web server interface 204. In embodiments, the request comprises an HTTP request.

In step 404, the content provider Web Server interface 204 sends a prompt to the content provider client 104 asking for the streaming media content.

As shown in step 406, the content provider continuously streams the media content to the content provider Web server interface 204 via the content provider client 104.

At step 410, after receiving the streaming media content, the content provider Web server interface 204 provides the content provider client 104 with address and source information. The address information points viewers who request the content provider's media content to the media transcoding engine 106 and the source information provides information concerning the source of the requested media content. In embodiments, the address and source information comprises a URL (Uniform Resource Locator) that points the viewer client 102 to the media transcoding engine 106 and provides information to the media transcoding engine 106 about the source of the requested media content. Content providers can post the URL as a link on their web-site, thereby allowing viewers who visit their web-site to click on the URL in order to access the media content via the media transcoding engine 106. After step 410, the flowchart 400 ends.

Methods by which published media content is accessed by a viewer according to preferred embodiments will now be described.

E. Accessing Media Content According to Embodiments

As described herein, systems and methods in accordance with preferred embodiments perform the transcoding of media content on demand, in response to a viewer's request to access media content. Additionally, preferred embodiments essentially perform the transcoding of media content in "real-time" after the publication of the media content, as part of the media content delivery process. In particular embodiments, the delay between the submission of a request to view media content to the media transcoding engine 106 and the delivery of the media content to the viewer client 102 will be approximately thirty seconds or less. However, the invention is not limited to a specific delivery time and can encompass a variety of delivery times greater than or less than thirty seconds.

Figure 5A:
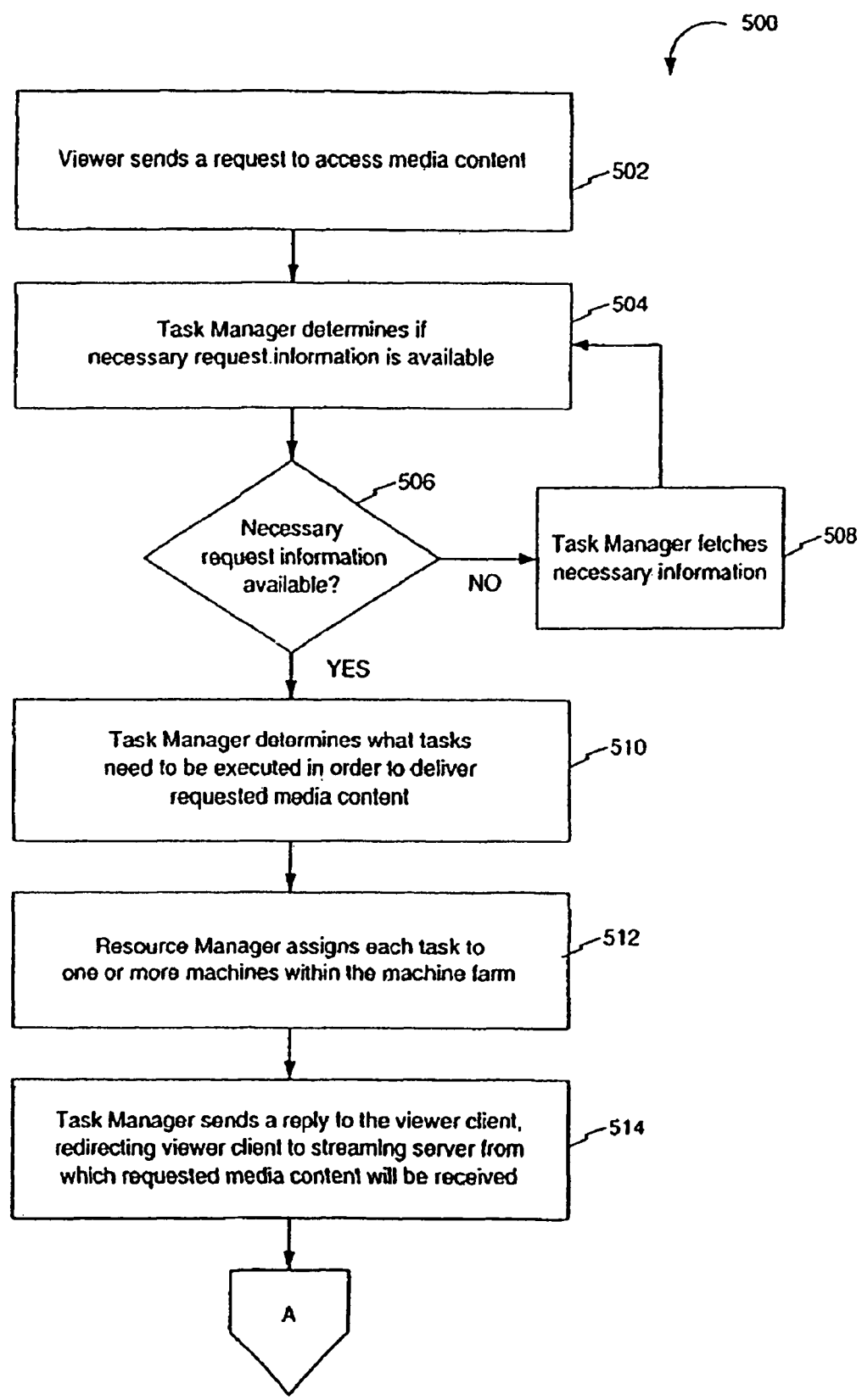
FIGS. 5A-5C are a flowchart that describes a routine for accessing media content according to an embodiment of the present invention.
Figure 5B:
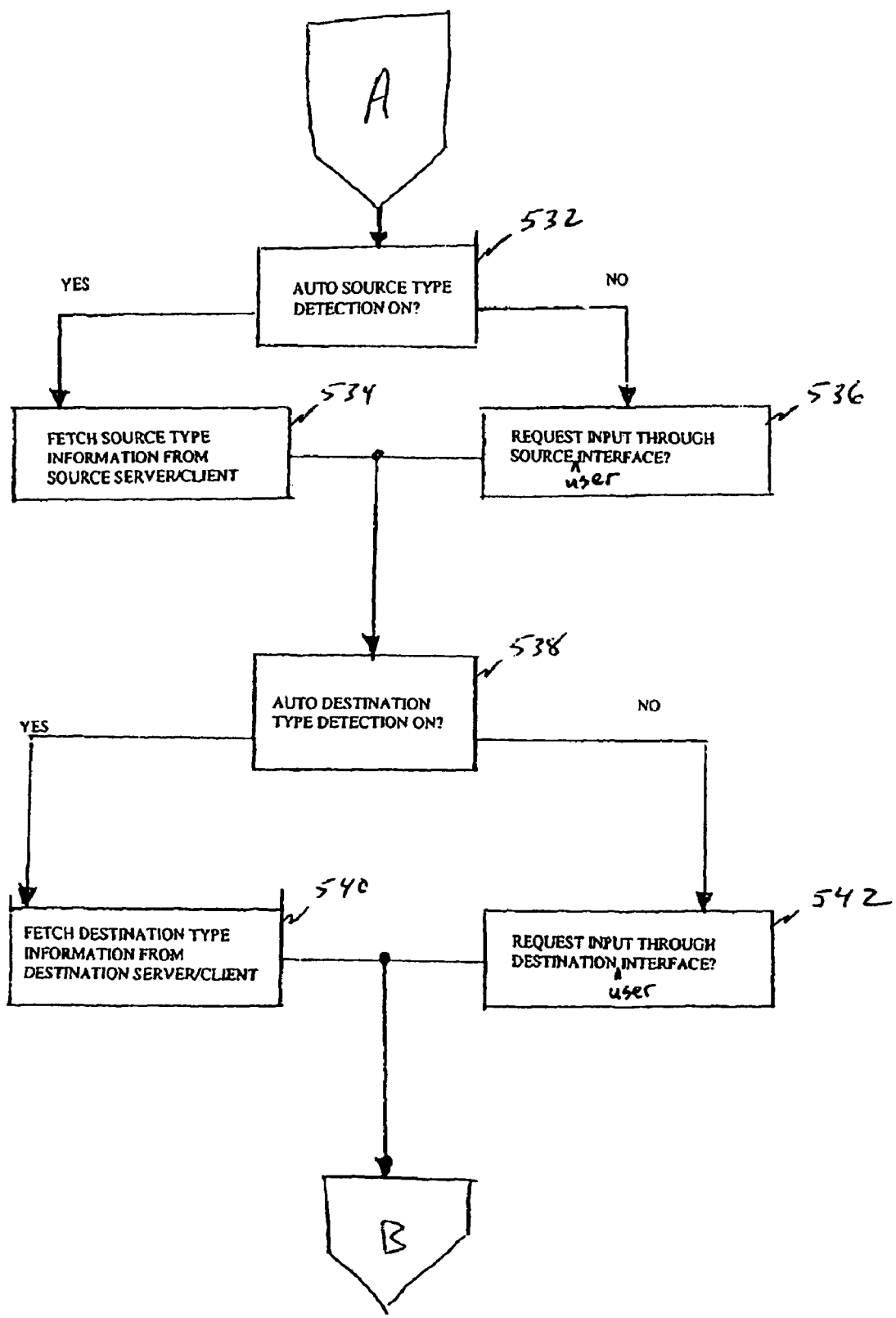
Figure 5C:
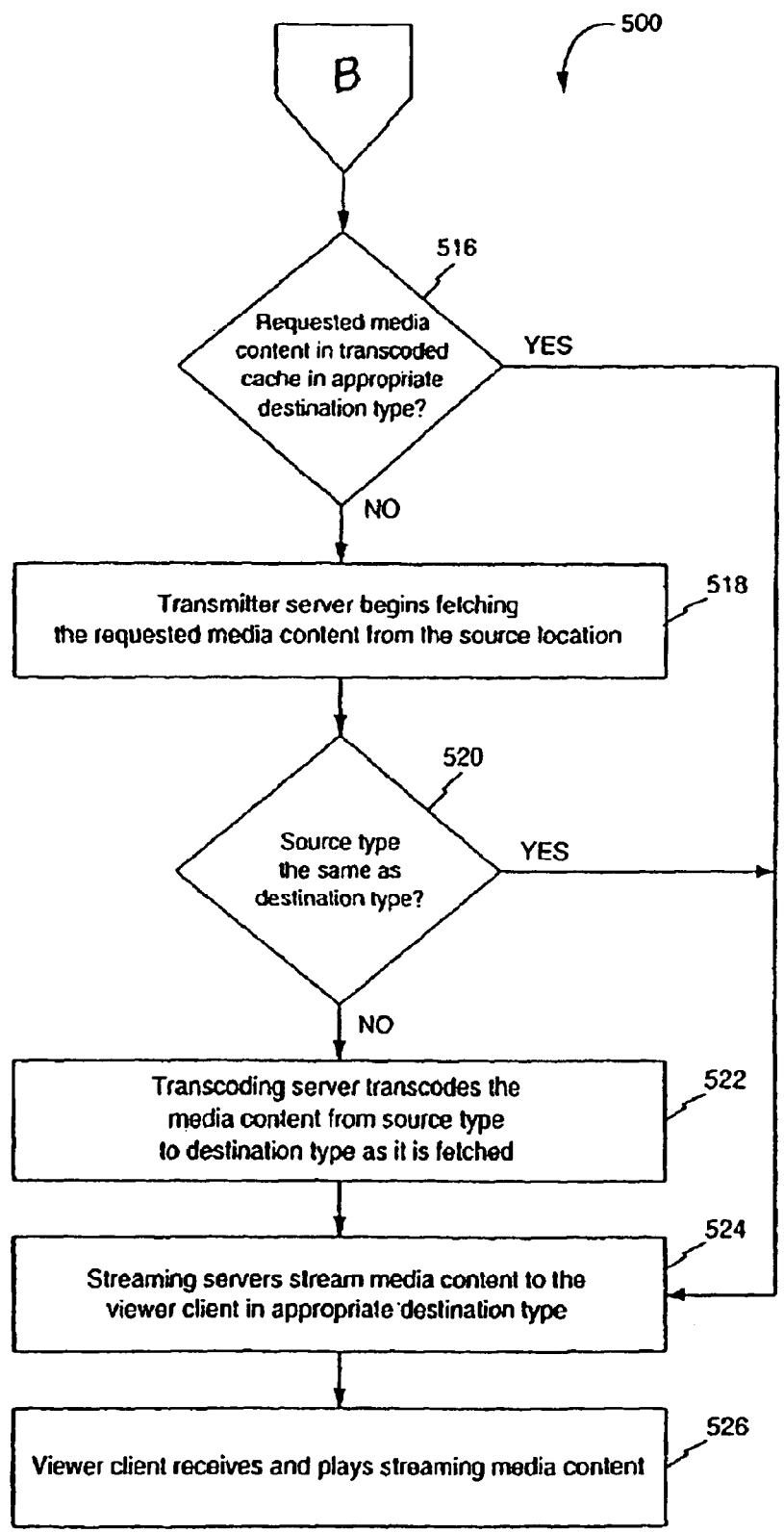

FIGS. 5A-5C depict a flowchart 500 of a method by which media content is accessed by a viewer according to embodiments of the present invention. The invention, however, is not limited to the description provided by the flowchart 500. Rather, it will be apparent to persons skilled in the art from the teachings herein that other functional flows are within the scope and the spirit of the present invention.

In step 502 of FIG. 5A, the viewer sends a request to access media content via the viewer client 102 to the viewer Web server interface 202 within the media transcoding engine 106. In embodiments, the request is an HTTP request generated by the viewer client 102 when the viewer clicks on a URL on the content provider's web-site. As discussed above, the URL link, which may be provided by the media transcoding engine 106 to the content provider during the media content publishing process, contains address information and source information that points the viewer client 102 to the media transcoding engine 106 and provides information to the media transcoding engine 106 about the source of the requested media content. After the viewer Web server interface 202 receives the request, it forwards it to the task manager 206.

In step 504, the task manager 206 parses the request to determine if the necessary request information is included in order to service the request. In embodiments of the invention where the request comprises an HTTP request, the task manager 206 parses the header of the HTTP request to determine if the necessary information is included in order to service the request. In embodiments, the necessary information includes at least a source location, a source type, a destination location, and a destination type. The source type and destination type are each defined by at least one publishing variable. In embodiments, publishing variables for media content can include, but are not limited to, the file format, bit rate, communication protocol(s), physical medium, compression algorithm, digital rights management information, or any combination thereof. In one embodiment, the information required for servicing the request includes at least a source location, a source format, a source bit-rate, a destination location, destination format, and a destination bit rate.

If the task manager 206 determines that the request information is not complete, the task manager 206 will fetch the necessary information as shown in steps 506 and 508. For example, if the source type or source location is not included in the request and the requested media content is stored within the media transcoding engine 106, the task manager 206 can consult the database 210 to find the necessary source information. Alternately, if the media content is stored externally with respect to the media transcoding engine 106, the task manager 206 can perform a network request to fetch the necessary information from the content provider's web-site. For example, the task manager 206 can perform an HTTP request, an RTSP request, or a request using any other standard network application protocol. Additionally, if the destination type is not available, the task manager 206 can fetch the needed information by querying the viewer client 102. As discussed above, in embodiments, the optimal destination type for the destination location may be stored as a "cookie" on the viewer client 102, which may be accessed by the task manager 206.

At step 510, once the task manager 206 has the necessary information to service the request, it then determines what tasks need to be executed in order to deliver the requested media content. The tasks include all the steps necessary to deliver the requested media content, and may include fetching the requested media content, transcoding the requested media content from the source type into the destination type, and streaming the transcoded media content to the viewer client 102. Once the task manager 206 has determined what tasks need to be executed, it then interfaces with the resource manager 208 and instructs the resource manager 208 to execute the required tasks.

The resource manager 208 receives the instruction to execute the required tasks from the task manager 206 and, at step 512, assigns each task to one or more machines within the machine farm 216. The resource manager 208 is programmed to achieve an efficient execution of tasks by the available resources. In embodiments, the allocation of resources to a given task by the resource manager 208 is determined based on a variety of factors including, but not limited to, which machines support the necessary utilities for performing the required task, which machines have available resources (for example, available CPU), and which machines can coordinate with each other to carry out the task when coordination is required for execution. The resource manager 208 can also be programmed to distribute tasks based on a variety of other criteria including the avoidance of network congestion. For example, the resource manager 208 may be programmed to assign decompression and compression tasks to the same machine in order to avoid the network congestion that may result from transmitting uncompressed data from one machine to another within the internal network of the media transcoding engine 106.

In accordance with a preferred embodiment, the resource manager 208 oversees tasks after they are assigned to make sure that they are properly executed. The resource manager 208 oversees the execution of assigned tasks by maintaining a list of all assigned tasks in the database 210 and periodically communicating with the slave monitor of each machine running a given task in order to determine the status of the task.

In embodiments, the resource manager 208 periodically polls the slave monitor of the machine to which the task has been assigned to determine the status of the task. In alternate embodiments, the slave monitor itself sends periodic status messages to the resource manager 208, informing it of the status of an assigned task. The resource manager 208 stores information that it receives from the slave monitors about the status of each task and each machine in the database in order to assist in its function of assigning and monitoring necessary tasks.

In an alternate embodiment, the slave monitors only initiate tasks received from the resource manager 208, and the tasks themselves report directly to the resource manager 208 rather than to the slave monitors.

The resource manager 208 monitors each assigned task in accordance with a fault tolerance routine that permits the resource manager 208 to determine when a task has failed and to execute the necessary steps for correcting the problem and ensuring the delivery of the requested media content. For example, if a machine to which a task has been assigned does not respond to a status query for a predetermined period of time, the resource manager 208 can be programmed to reassign the task to a different machine and re-boot the machine that is not responding. Additionally, where the failure of a task also results in the failure of a chain of distributed dependent tasks, the resource manager 208 can be programmed to shut down all the dependent tasks and re-assign the entire set of tasks in order to ensure the delivery of the requested media content. These examples are not limiting, and other fault tolerance schemes will be apparent to one of ordinary skill in the relevant art based on the teachings contained herein, and the invention is directed to such other fault tolerance schemes.

In a further embodiment, individual tasks are each assigned a priority. The resource manager 208 monitors new tasks and when the priority of an existing task is lower than that of a new task that needs to be assigned, the resource manager 208 will instruct the existing task to kill itself to accommodate the new higher-priority task. Alternately, the slave monitor can kill the existing task. An example of a low priority task includes the transcoding of media content for a viewer after the viewer has stopped viewing the requested content.

At step 514, after all the tasks have been assigned, the task manager 206 constructs a reply to the initial request to access media content received from the viewer client 102. The reply serves to redirect the viewer client 102 to a streaming server or proxy server from which the requested media content will ultimately be received by the viewer client 102. In embodiments, the reply comprises an HTTP reply.

At step 532, a determination is made whether auto source type detection in accordance with a preferred embodiment is turned on. The system may be permanently set to automatic source type detection on or to automatic source type detection off or it may be selectively toggled. If the automatic source type detection is permanently on or off, then the determination is not necessary and the method can move to the corresponding step 534 or 536. In the method illustrated at FIG. 5B, after the determination is made, then the method move to the next corresponding step. That is, if automatic source type detection is turned on, then at step 534, source type information is automatically fetched from source server or client. An advantage is that this is quicker and simpler for the user. Alternatively, if automatic source type detection is turned off, then at step 536, input is requested through a source user interface from a user who is demanding the content. An advantage is that a user with multiple source types for the content can choose between them, or if the source has a firewall such that the source type cannot be readily detected with user input.

At step 538, a determination is made whether auto destination type detection in accordance with a preferred embodiment is turned on. The system may be permanently set to automatic destination type detection on or to automatic destination type detection off or it may be selectively toggled. If the automatic destination type detection is permanently on or off, then the determination is not necessary and the method can move to the corresponding step 540 or 542. In the method illustrated at FIG. 5B, after the determination is made, then the method move to the next corresponding step. That is, if automatic destination type detection is turned on, then at step 540, destination type information is automatically fetched from destination server or client. An advantage is that this is quicker and simpler for the user. Alternatively, if automatic destination type detection is turned off, then at step 542, input is requested through a destination user interface from a user who is demanding the content. An advantage is that a user with multiple destination types for the content can choose between them, or if the destination has a firewall such that the destination type cannot be readily detected with user input.

Further criteria independent of destination type may be detected and applied based upon designated rules, e.g., as set out by the publisher of the media content or otherwise based upon a business rule. For example, bandwidth criteria may be based upon a customer's contract, or a trailer or a clip or both may be inserted with the transcoded media content upon request by a publisher.

At steps 516-526 of FIG. 5C, the machines within the machine farm 216 perform the steps necessary to deliver the requested media content in accordance with the assigned tasks received from the resource manager 208. In embodiments of the present invention, the delivery of media content is a pipelined process in which the fetching, transcoding and streaming of different portions of the same media content stream may occur simultaneously. The resource manager 208 arranges for the pipelining of these steps through resource allocation within the media transcoding engine 106. The pipelining of these steps results in a faster delivery time for requested media by the media transcoding engine 106.

As shown at step 516, if the requested media content already resides in the transcoded cache 212 transcoded into the appropriate destination type (e.g., the appropriate destination format and bit-rate or other appropriate publishing variables), then the delivery of content is achieved by the streaming servers 222 at step 524, which stream the transcoded media content to the viewer client 102 as described below.

If, however, the requested media content does not reside in the transcoded cache 212 transcoded into the appropriate destination type, then one of the transmitter servers 220 within the machine farm 216 begins fetching the requested media content as a data stream from the source location as shown at step 518. As discussed above in regard to FIGS. 3 and 4, in embodiments of the invention, the requested media content can initially either reside within the master archive 214 within the media transcoding engine 106, in an archive external to the media transcoding engine 106, or be received as a streaming feed directly from the content provider client 104. Where the requested media content resides within the master archive 214, one of the transmitter servers 220 fetches the requested media content over the internal network of the media transcoding engine 106.

Where the requested media content resides in an archive outside of the media transcoding engine 106, one of the transmitter servers 220 uses the access information provided during the publishing process to fetch the requested media content. In embodiments, after the transmitter server uses the access information to fetch the requested media content, the requested media content may be temporarily cached in the master archive 214, permitting expedited access to the media content when subsequent requests for the same media content are received by the media transcoding engine 106.

Where the requested media content is a streaming feed directly from the content provider client 104, one of the transmitter servers 220 fetches the streaming data from the content provider Web server interface 204. Because embodiments of the present invention do not fetch and transcode the streaming data until it is actually requested by a viewer, unnecessary transcoding of media content is thereby avoided.

As shown in step 520, after the transmitter server begins fetching the requested media content, if the source type is the same as the destination type (e.g., the source format and bit rate is the same as the destination format and bit-rate), then no transcoding is necessary and the media content is transmitted to the streaming servers 222 as soon it is fetched. The streaming servers 222 then stream the content to the viewer client 102 at step 524, as described below. However, if the source type is not the same as the destination type, then one of the transcoding servers 218 within the machine farm 216 will transcode the media content from the source type to the destination type as shown in step 522. In accordance with the discussion in regard to step 512, above, the resource manager 208 assigns the transcoding task to a transcoder server that runs the necessary transcoder software for performing the appropriate conversion of publishing variables. In embodiments, the transcoding is carried out using one of a variety of well-known methods and for converting media content of one type to another, including conventional codec routines for transcoding media content. Further description of transcoding operation and examples are provided below. In embodiments, after the transcoding is complete, a copy of the transcoded media content is temporarily stored in the transcoded cache 212, permitting expedited delivery of the media content when subsequent requests for the same media content transcoded into the same destination type are received by the media transcoding engine 106.

In step 524, one of the streaming servers 222 streams the media content in the appropriate destination type to the viewer client 102 as soon as it is received from either a transcoder, a transmitter or the transcoded cache 212. In embodiments, the transcoded media content is streamed to the viewer client 102 via an optional proxy server, as discussed above in regard to FIG. 2. In further embodiments, either the streaming server or the optional proxy server keep usage statistics pertaining to the media content being delivered as well as the destination types in which the media content is being delivered that are used by the resource manager 208 for cache management purposes.

In embodiments, the protocol used for streaming media to the viewer client and for streaming data between the transmitter servers 220, transcoder servers 218 and the streaming servers 222 is a standard protocol for streaming media, such as RTSP. Alternately, a proprietary protocol defined over standard network protocols like TCP/UDP can be used. In further embodiments, different protocols may be used to accommodate different network infrastructure needs. For example, protocols may be implemented that dynamically change according to network traffic conditions. However, these examples are illustrative. The present invention is not intended to be limited to a specific communication protocol or application, and other proprietary or non-proprietary network communication protocols and applications can be used.

At step 526, the viewer client 102 receives the streaming media content from either the streaming server or the proxy server. At this point, the viewer client 102 plays the media content in accordance with the destination type associated with the media player resident on the viewer client 102. In alternate embodiments of the present invention, the media content may be received and stored as a downloaded file on the viewer client 102 for playing at a later time, or for transfer to an alternate media playing device. After step 526, the flowchart 500 ends.

F. Further Transcoder Operation and Media Content Examples

As described above, media transcoding engine 106 includes one or more transcoders 218. Transcoders 218 convert certain types of media content (referred to herein as a source type) to another type of media content (referred to herein as a destination type). Transcoding can involve a number of different conversion operations. The particular conversion operations used depend upon the media content and associated publishing variables being converted. Publishing variables as used herein refers to different characteristics of media content.

According to a preferred embodiment, media content is digital data being published over a network. In this case, publication refers to digital data which has been formatted for delivery over a network and for viewing by a destination media player. Publishing variables for media content can include, but are not limited to, the file format, bit rate, communication protocol(s), physical medium, compression algorithm, and/or digital rights management information.

The digital data can be any type of file format including but not limited to container formats, bitmap formats, video formats, audio formats, vector formats, metafile formats, scene formats, animation formats, multimedia formats, hybrid formats, hypertext and hypermedia formats, three-dimensional data (3D) formats, virtual reality modeling language (VRML) formats, font formats (bitmap fonts, stroke fonts, spline-based outline fonts), page description language (PDL) formats, and any other type of graphics file format or other file format. Table 1 lists examples of such file formats that can be used in embodiments of the present invention:

TABLE 1

Example File Formats

| Format | Type |
|---|---|
| ADOBE ILLUSTRATOR | Metafile |
| ADOBE PHOTOSHOP | Bitmap |
| ATARI ST GRAPHICS FORMATS | Bitmap and Animation |
| AUTOCAD DXF | Vector |
| AUTODESK 3D STUDIO | Scene Description |
| BDF | Bitmap |
| BRL-CAD | Other |
| BUFR | Other |
| CALS RASTER | Bitmap |
| CGM | Metafile |
| CMU FORMATS | Multimedia |
| DKB | Scene Description |
| DORE RASTER FILE FORMAT | Bitmap |
| DPX | Bitmap |
| DR. HALO | Bitmap |
| DVM MOVIE | Animation |
| ENCAPSULATED POSTSCRIPT | Metafile (page description language) |

TABLE 1-continued

Example File Formats

| Format | Type |
| --- | --- |
| FACESAVER | Bitmap |
| FAX FORMATS | Bitmap |
| FITS | Other |
| FLI | Animation |
| GEM RASTER | Bitmap |
| GEM VDI | Metafile |
| GIF | Bitmap |
| GRASP | Animation |
| GRIB | Other |
| HARVARD GRAPHICS | Metafile |
| HIERARCHICAL DATA FORMAT | Metafile |
| IFF | Bitmap |
| IGES | Other |
| INSET PIX | Bitmap |
| INTEL DVI | Multimedia |
| JPEG FILE INTERCHANGE FORMAT | Bitmap |
| KODAK PHOTO CD | Bitmap |
| KODAK YCC | Bitmap |
| LOTUS DIF | Vector |
| LOTUS PIC | Vector |
| LUMENA PAINT | Bitmap |
| MACINTOSH PAINT | Bitmap |
| MACINTOSH PICT | Metafile |
| MICROSOFT PAINT | Bitmap |
| MICROSOFT RIFF | Multimedia |
| MICROSOFT RTF | Metafile |
| MICROSOFT SYLK | Vector |
| MICROSOFT WINDOWS BITMAP | Bitmap |
| MICROSOFT WINDOWS METAFILE | Metafile |
| MIFF | Bitmap |
| MPEG | Other |
| MTV | Scene Description |
| NAPLPS | Metafile |
| NFF | Scene Description |
| OFF | Scene Description |
| OS/2 BITMAP | Bitmap |
| P3D | Scene Description |
| PBM., PGM., PNM., and PPM. | Bitmap |
| PCX | Bitmap |
| PDS | Other |
| PICTOR PC PAINT | Bitmap |
| PIXAR RIB | Scene Description |
| PLOT-10 | Vector |
| PNG | Bitmap |
| POV | Vector |
| PRESENTATION MANAGER METAFILE | Metafile |
| PRT | Scene Description |
| QRT | Scene Description |
| QUICK TIME | Other |
| RADIANCE | Scene Description |
| RAYSHADE | Scene Description |
| RIX | Bitmap |
| RTRACE | Scene Description |
| SAF | Bitmap and other |
| SENSE8 NFF | Scene Description |
| SGI IMAGE FILE FORMAT | Bitmap |
| SGI INVENTOR | Scene Description |
| SGI YAODL | Scene Description |
| SCO | Vector |
| SPIFF | Bitmap |
| SUN ICON | Bitmap |
| SUN RASTER | Bitmap |
| TDDD | Vector and Animation |
| TGA | Bitmap |
| TIFF | Bitmap |
| TTDDD | Vector and Animation |
| URAY | Scene Description |
| UTAH RLE | Bitmap |
| VICAR2 | Bitmap |
| VIFF | Bitmap |
| VIS-5D | Vector |
| VIVID AND BOB | Scene Description |
| WAVEFRONT OBJ | Vector |
| WAVEFRONT RLA | Bitmap |
| WORDPERFECT GRAPHICS METAFILE | Metafile |
| XBM | Bitmap |
| XPM | Bitmap |
| XWD | Bitmap |
| ZBR | Metafile |

See, Murray and vanRyper, pp. 12-26. These examples are illustrative and not intended to limit the present invention. Other file formats (now known or developed in the future) can be used as would be apparent to a person skilled in the art given this description.

Even within the same file format, digital data can be compressed according to different compression algorithms. In a QUICK TIME formatted file, for example, video can be compressed in accordance with H.263, CINEPAK, JPEG, QT ANIMATION, or QT VIDEO standards. As a further example, in a WINDOWS MEDIA ASF formatted file, audio can be compressed in accordance with the MICROSOFT AUDIO FORMAT, ACELP, VOXWARE, or MP3 standards. Compression algorithm choices can be made based on optimization according to bit-rate choices, or according to the nature of the content. For example, video files in which little motion occurs ("talking heads") and video files in which there is a substantial amount of motion ("high-motion" video) may each be more efficiently compressed using different compression algorithms.

Within any one compression algorithm, there can be further variations. For example, files compressed according to the JPEG standard can be either YUB-based or RGB-based.

In addition to the publishing variables set forth above, there are also publishing variables unique to video data and audio data.

Publishing variables for video data include the width and height of the video image in pixels as well as the frame rate of the video. Depending on the bit-rate requirements and the nature of the data, different settings may be necessary in order to ensure the best picture quality. For example, some video may be better viewed at 15 frames per second at 160.times.120 pixels, while some others may be better viewed at 5 frames per second at 320.times.240 pixels, even at the same bit-rate. Where the bit-rate is 56K bps, picture quality becomes very limited, and it is almost never optimal to deliver video in 640.times.480 pixel resolution. Yet another publishing variable for video data is the number of bits per component.

Publishing variables for audio data include the number of samples per second, the number of channels (e.g., mono, stereo, 5-channel) and the sample size (8-bit, 16-bit, etc.). Different settings may be necessary to ensure audio quality in light of a particular content type and bit-rate. Publishing variables may also include the size of data packets being sent and the choice of transmission protocol (e.g., TCP vs. UDP).

Figure 6:
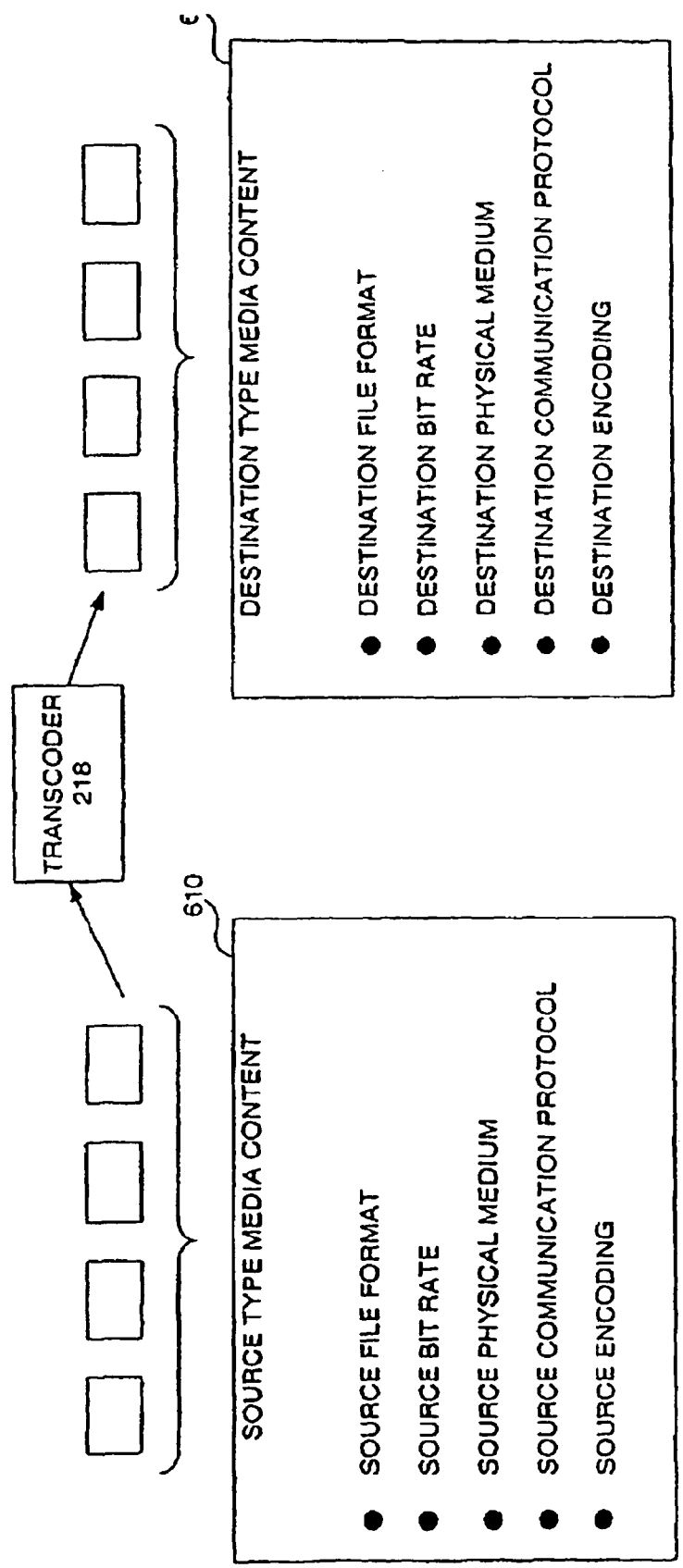
FIG. 6 depicts an exemplary transcoder that may be used in accordance with embodiments of the present invention.

FIG. 6 shows an example transcoder 218 that transcodes on demand source type media content 610 to destination type media content 650. Source type media content 610 is digital data delivered over a network in one or more packets. The digital data that forms source type media content 610 is defined by one or more publishing variables. The publishing variables as shown in FIG. 6 include one or more of the following variables: source file format, source bit rate, source physical medium, source communication protocol, source encoding, or any combination thereof. Destination type media content 650 is digital data delivered over a network in one or more packets to an end user that demands the media content. The digital data that forms destination type media content 650 is also defined by one or more publishing variables. The publishing variables as shown in FIG. 6 include one or more of the following variables: destination file format, destination bit rate, destination physical medium, destination communication protocol, destination encoding, or any combination thereof.

FIG. 7 shows a table of an example implementation where one or more transcoders 218 transcodes on demand from a source type media content 710 to a first destination type 750. FIG. 7 also shows an example implementation where one or more transcoders 218 transcodes on demand from a source type media content 710 to a second destination type 760. The source type media content 710 includes digital data published according to the following source publishing variables: namely, the physical medium is a local disk, the communication protocol includes a file I/O, the file format is MP3 using MP3 encoding at a bit rate of 128 kilobits per second (kbps). The first destination type media content 750 includes digital data transcoded for publication according to the following destination publishing variables: namely, the physical medium is a packet-switched network (the Internet), the communication protocol includes WINDOWS MEDIA STREAMING MMS protocol, the file format is WINDOWS MEDIA FILE, using MP3 encoding at a bit rate of 56 kbps. The second destination type media content 760 includes digital data transcoded for publication according to the following destination publishing variables: namely, the physical medium is a Wireless Network, the communication protocol includes HTTP, the file format is MP3 including MP3 encoding at a bit rate of 12 kbps.

Other examples are shown in the following tables:
Tables 2-5: Example Transcoder Operations

TABLE 2

| Publishing Variables | Source Type | Destination Type |
|---|---|---|
| physical medium | Disk | Network |
| communication protocol(s) | File I/O | RTSP |
| container format | MPEG1 | QUICK TIME |
| encoding | MPEG1 | SORENSON (video) |
|  |  | QDESIGN (audio) |
| bit rate | 1.5 Mbps | 300 kbps |

TABLE 3

| Publishing Variables | Source Type | Destination Type |
|---|---|---|
| physical medium | Wired Network | Wireless Network |
| communication protocol(s) | HTTP | MMS |
| container format | MPEG1 | WINDOWS MEDIA |
| encoding | MPEG1 | MPEG4 (video) |
|  |  | MSAUDIO (audio) |
| bit rate | 1.5 Mbps | 100 kbps |

TABLE 4

| Publishing Variables | Source Type | Destination Type |
|---|---|---|
| physical medium | Wired Network | Wired Network |
| communication protocol(s) | HTTP | RTSP |
| container format | QUICK TIME | REAL |

TABLE 4-continued

| Publishing Variables | Source Type | Destination Type |
|---|---|---|
| encoding | H.263 | REAL PROPRIETARY G2 Video/Audio |
| bit rate | 56 kbps | 56 kbps |

TABLE 5

| Publishing Variables | Source Type | Destination Type |
|---|---|---|
| physical medium | Disk | Wireless Network |
| communication protocol(s) | File I/O | HTTP |
| container format | MPEG1 | MP3 |
| encoding | MPEG1 | audio only - MP3 |
| bit rate | 1.5 Mbps | 16 kbps |

These examples are illustrative and not intended to limit the present invention. Other types of on demand transcoding operations that are known now or developed in the future can be used as would be apparent to a person skilled in the art given this description.

Figure 8A:
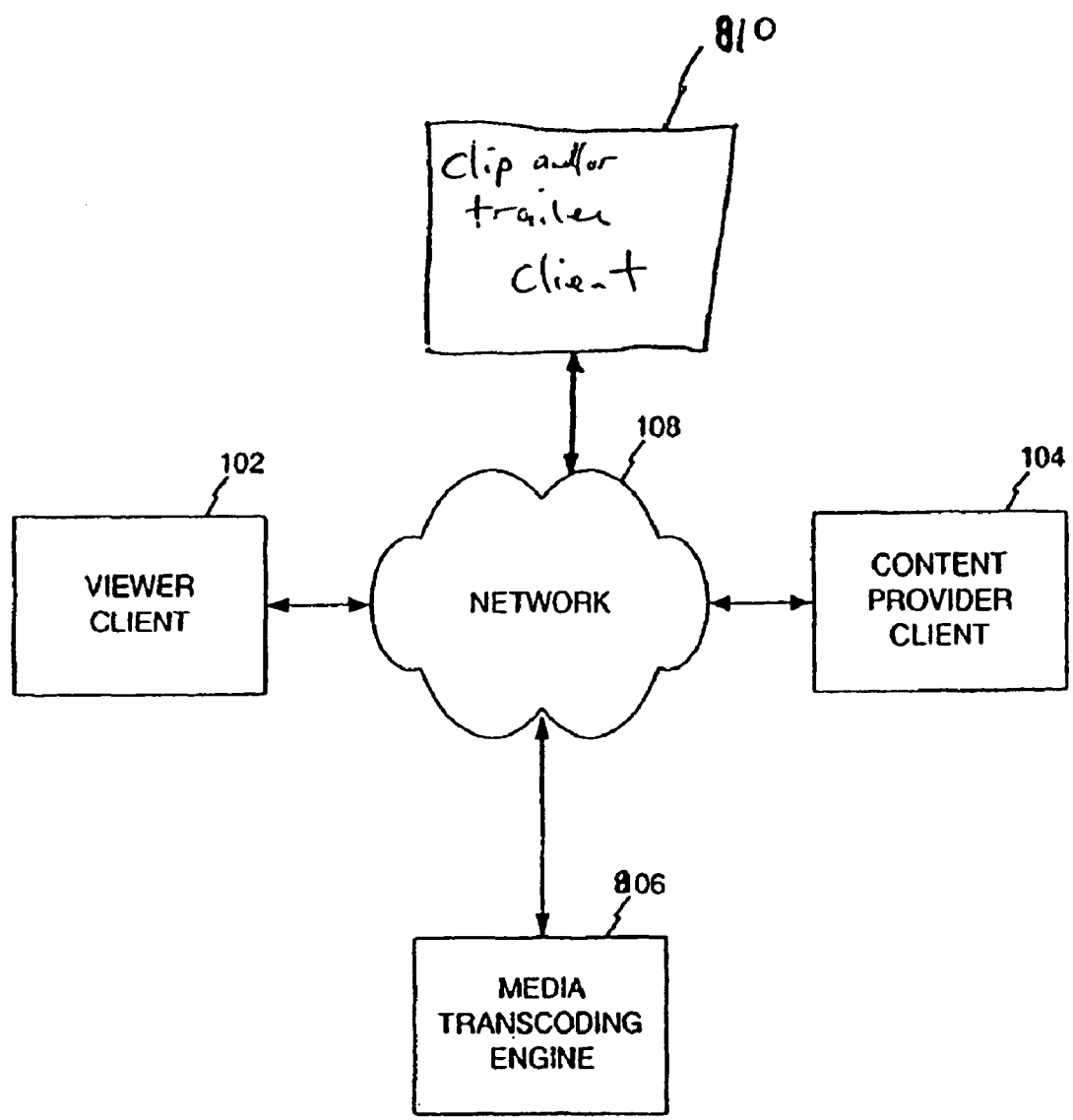
FIG. 8A is a block diagram of a media transcoding system according to another embodiment of the present invention.

FIG. 8A is a block diagram of a media transcoding system in accordance with another preferred embodiment. The system of FIG. 8A includes the viewer client 102, content provided client 104, and network 108 as described above with reference to FIG. 1 and that above description is incorporated by reference and not repeated here. FIG. 8A further includes a clip and/or trailer module 110. FIG. 8A also illustrates a media transcoding engine 806 that is a modified version of the media transcoding engine 106 described above with reference to FIGS. 1-2. The media transcoding engine 806 will be described in more detail with reference to FIG. 8B. The clip and/or trailer module may be included with components of other embodiments described herein such as that described with reference to FIG. 9A.

A clip is an overlay or substitute image portion that is meant to be added to or substitute for, respectively, a subgroup of pixels of at least some of the frames of the transcoded media that is delivered to the destination. A television station or other corporation or business, e.g., may insert its logo or trademark as advertising in a corner of the images that make up the transcoded media. A clip can include a strip, block or blob of arbitrary shape, a frame around the images or otherwise, and a clip may change or remain the same over the frames within which it is inserted. Multiple clips may be inserted at the same time and/or consecutively.

A trailer is a group of frames that are inserted between frames of the transcoded media. They are meant to be additional frames that do not overlay or substitute for frames or images of the transcoded content. Commercials, public service announcements, "editor's cut" commentaries about the transcoded media, descriptions of differences between the transcoded content and other previous or contemporaneous versions of it, or "bloopers", e.g., may be types of trailers that may be inserted.

The content provider client 104 may send the clip or trailer along with the content alternatively to the separate communication channels illustrated at FIG. 8A. Moreover, the clip and/or trailer may be automatically sent or sent upon actions made by the content provider 104, or may be retrieved by the media transcoding engine 806. The media transcoding engine 806 may generate or retrieve from a third party source the clip and/or trailer upon request by the content provider 104.

Figure 8B:
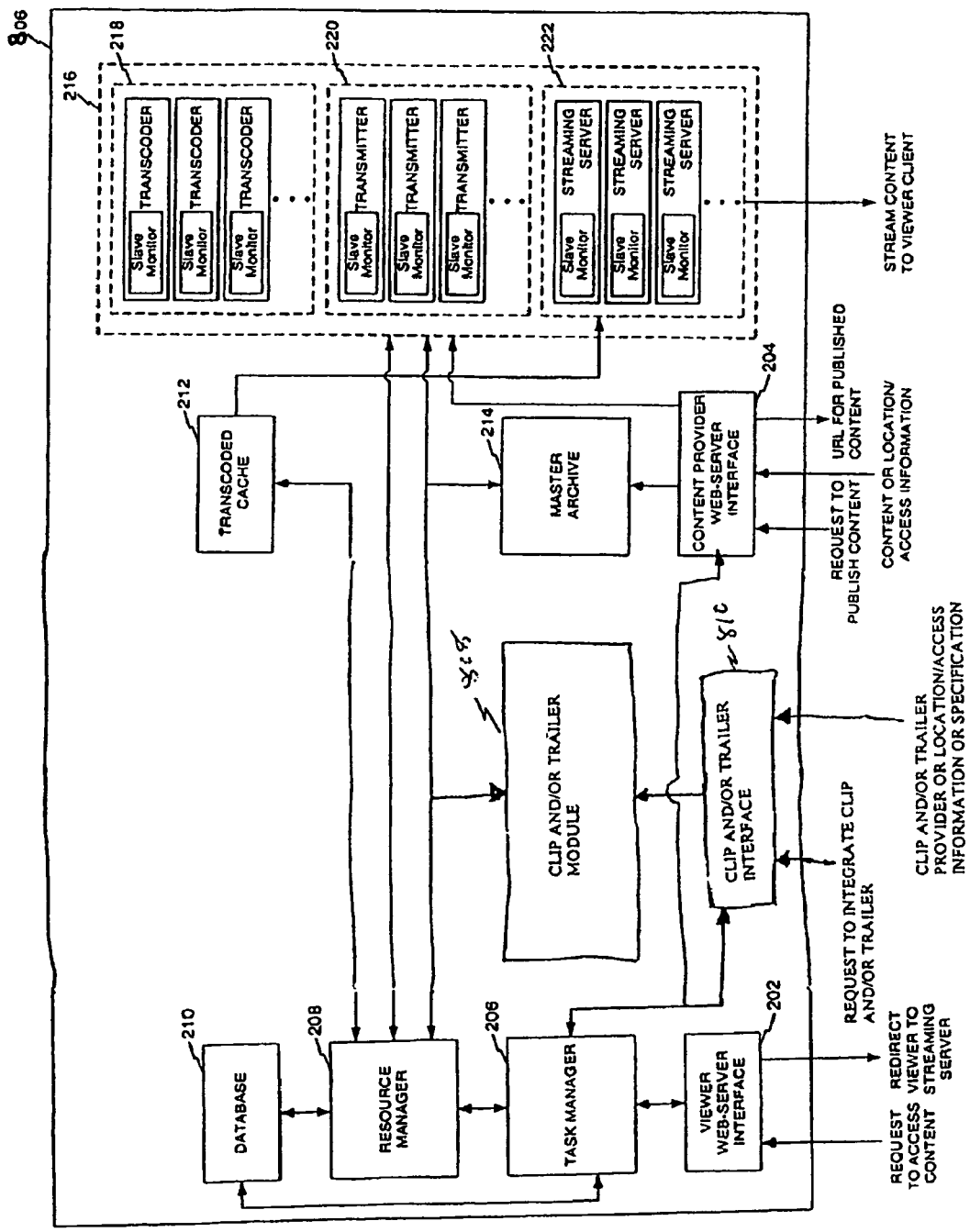
FIG. 8B is a block diagram of an example media transcoding engine according to another embodiment of the present invention.

FIG. 8B is a block diagram of another example media transcoding engine 806 according to the embodiment of FIG.

8A. The media transcoding engine 806 has many similar features to the engine 106 described above with reference to FIG. 2 and that description is incorporated by reference and not repeated here. Also, the features of FIG. 8B may be included with components of other embodiments described herein such as that described with reference to FIG. 9B. A clip and/or trailer interface 810 may be separate or integrated with the content provider web server interface 204 of the engine illustrated at FIG. 8B.

The clip and/or trailer interface 810 is preferably configured to receive requests to integrate a clip and/or trailer with media content. In this case, e.g., the clip and/or trailer may be in a known database associated with the engine 806 or may have to be generated by the engine or a system in communication with the engine 806. The clip and/or trailer is preferably also configured such that a clip and/or trailer may be provided, or the location of a clip and/or trailer may be provided at a particular URL, clip/trailer database, etc. The task manager 206 may communicate with the clip and/or trailer interface 810 of FIG. 8B in similar fashion as it does with the content provider web server interface 204.

A clip and/or trailer module 810 may include archived clips and/or trailers or information as to locations of clip and/or trailers or components that may be assembled into clips and/or trailers or one or more clip or trailer generating engines, etc. The clip and/or trailer module 810 may interface with the resource manager 208 and/or machine farm 216 in similar fashion as the master archive 214. The clip and/or trailer may be overlayed, substituted, added or otherwise into transcoded media content before, during or after the transcoding is performed.

Figure 9A:
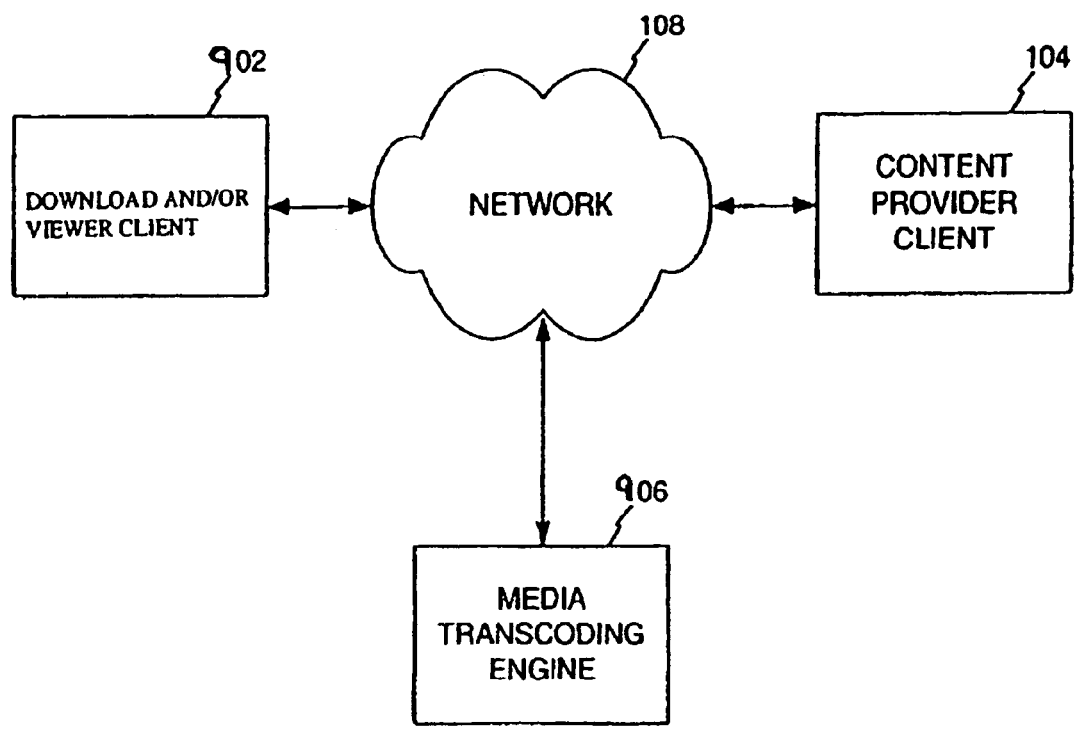
FIG. 9A is a block diagram of a media transcoding system according to another embodiment of the present invention.

FIG. 9A is a block diagram of a media transcoding system according to another preferred embodiment. In this embodiment, transcoded media content may be downloaded to a client or streamed for viewing by the client as described above with reference to FIG. 1, and the description with reference to FIG. 1 is incorporated by reference and not repeated here. The viewing of the streaming media is typically such that a destination user may view the content once at any time or in a range of times or at one of a selection of times or at a particular time. However, the destination user typically has no greater control over the transcoded content. The transcoded content is streamed from the streaming server 222 of FIG. 2 and the destination user browses or views that content with a particular viewer for which the content has been particularly transcoded. In the download variation, the transcoded media content is downloaded to the destination which can save it into its memory. Then, the time of viewing, the number of times of the viewing, which computer it is viewed on, etc., may be more flexibly decided by source and destinations users and/or component modules.

The downloading may be fully performed prior to viewing or it may be progressive. That is, a portion of the transcoded media content may be downloaded and then viewed, while a second portion of the media content is being downloaded. That second portion would then be viewed after the first portion is viewed and while a third portion is being downloaded, and so on. Where the term downloading is used herein, it is meant to include both traditional full downloading prior to viewing and progressive downloading.

Figure 9B:
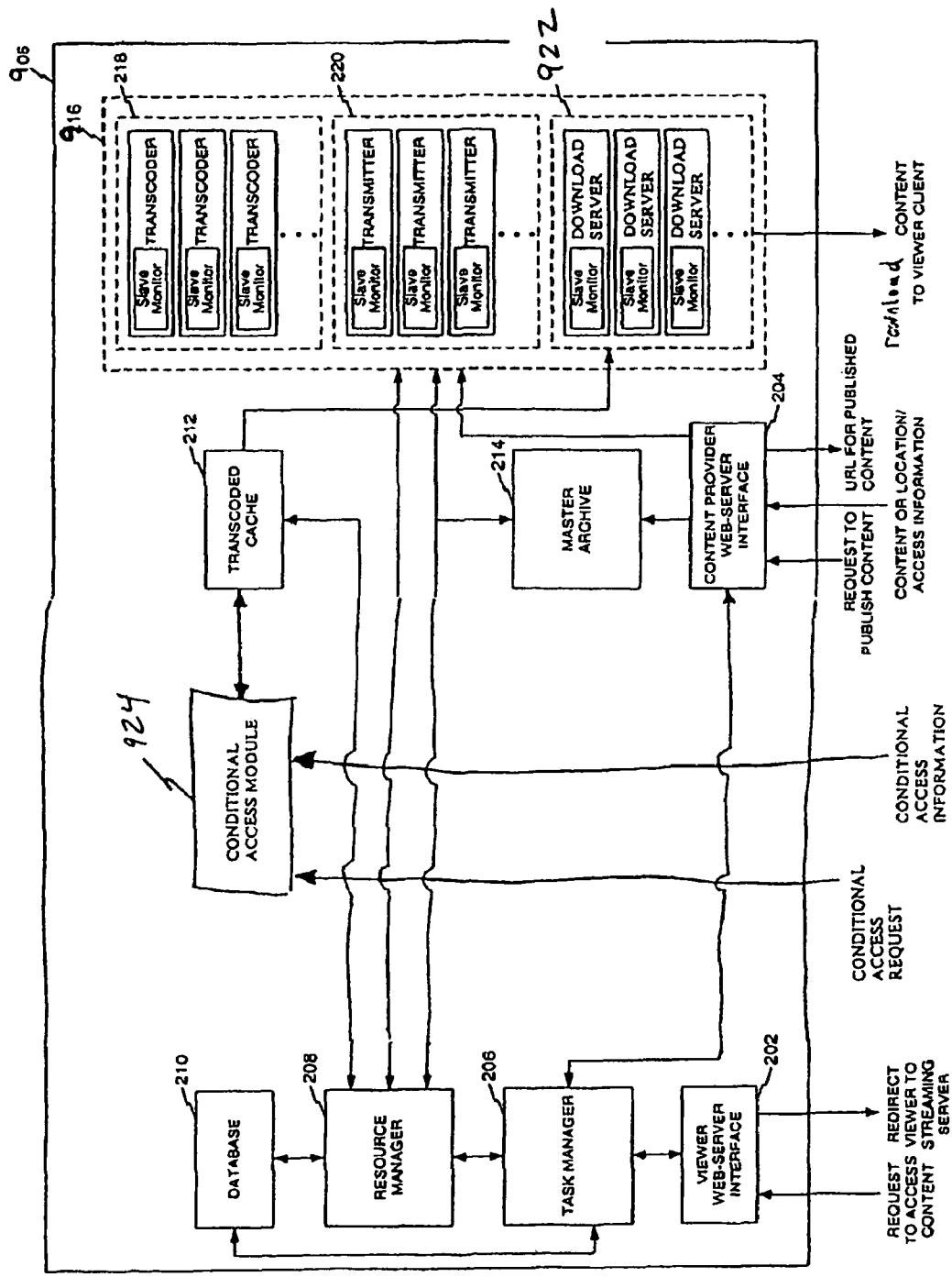
FIG. 9B is a block diagram of an example media transcoding engine according to another embodiment of the present invention.

FIG. 9B is a block diagram of an example media transcoding engine 906 according to FIG. 9A and another preferred embodiment. The components of FIGS. 2 and 8B are preferably and alternatively utilized with the engine 906 of FIG. 9B, and so their descriptions are incorporated by reference and not repeated here. Within the machine farm 916 are download servers 922 in addition to or substituting for the streaming servers 222 of FIG. 2. Transcoded media content may be downloaded to the download and/or viewer client 902 of FIG. 9A.

A conditional access module 924 is preferably included with the media transcoding engine 906. The conditional access module 924, or an interface separately associated therewith, may receive a conditional access request and/or conditional access information that may be programmed with the transcoded media content to be downloaded. With conditional access restraint built-in, even though the transcoded media content is downloaded to the destination client site, the freedom of the destination client will still be constrained according to the conditional access limitations that otherwise would not exist technologically with the downloaded media content. Such conditional access restrictions are easily controlled by streaming servers 222 of the embodiment of FIG. 2, and thus the streaming content does not need conditional access controls built-in in order that access be constrained. Examples of conditional access constraints may include number of viewings, range of viewing times, selection among viewing times, etc., as may be understood by those skilled in the art or as may be desired or agreed upon by the source, third party and/or destination entities involved.

With downloading capability, publishers may preview transcoded media content. Unlimited access provisions may also be provided to end-users who may re-save, re-view or move the transcoded media content after download. Preferential redeployment by end-users subject to publisher-initiated constraints is possible.

Figures 10, 11:
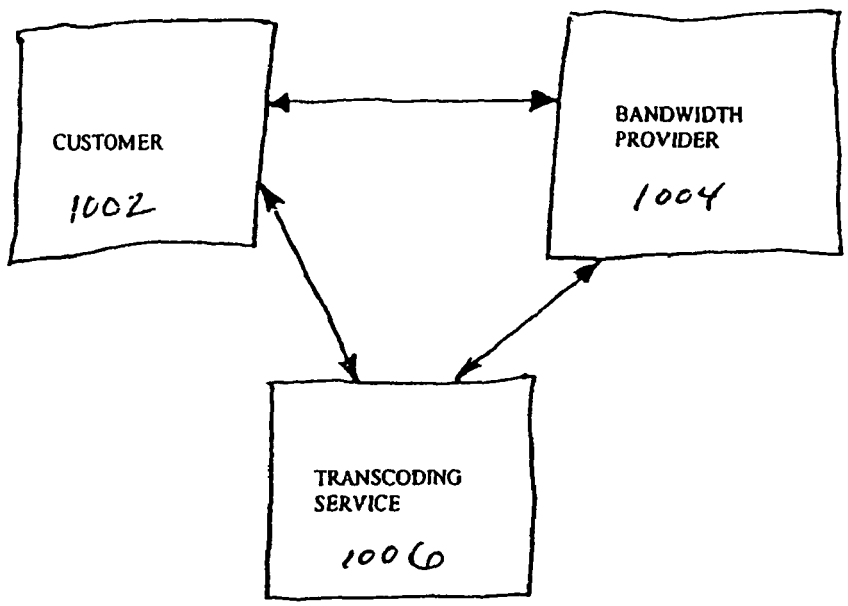
FIG. 10 is a block diagram of an example transcoding service according to another embodiment of the present invention.
FIG. 11 is a table illustrating a steady cache transfer balancing system and method according to another embodiment of the present invention.

FIG. 10 is a block diagram of an example transcoding service according to another preferred embodiment. In this embodiment, a customer 1002 may desire transcoded media content in addition to the bandwidth needed or desired to transmit it. Alternatively, the customer 1002 may already have arrangements with a bandwidth provider 1004 (e.g., Akamai Corp.) and only desires or needs the transcoded media content from the content transcoding service 1006. Advantageously, transcoded media content may be provided with necessary or desired bandwidth provided from bandwidth provider 1004 through the transcoding service 1006, or the customer 1002 may separately attain the transcoded media content from the transcoding service 1006 and the bandwidth from the bandwidth provider 1004.

FIG. 11 is a table illustrating a steady cache transfer balancing system and method according to another preferred embodiment. In this embodiment, it is understood that transcoded media content is not always demanded steadily and instead has on-peak and off-peak demand periods that may occur daily, weekly, monthly and/or seasonally. However, it is not efficient to transcode media content always at the time of demand, because then the infrastructure involved in transcoding during on-peak periods is sitting idle during off-peak periods. The steady cache transfer balancing according to a preferred embodiment and referring to FIG. 11 provides that efficiency so that infrastructure can be reduced while on-peak demand may be still met. Referring to FIG. 11, off-peak caching operations preferably include caching and steaming requested content, pre-caching anticipated and/or pre-order content, and storing pre-cache records into pre-cache archive. These of-peak activities permit the on-peak activities to include caching and streaming requested content, pulling records the pre-cache archive and streaming the pre-cache records. Note that the records may be streamed or downloaded according to alternative embodiments described elsewhere herein. In this embodiment, less caching is required at on-peak times than in a system wherein caching is performed only at the times that requests are received.

G. Alternate Embodiments

Example embodiments of the methods and systems of the present invention have been described herein. As noted elsewhere, these example embodiments have been described for illustrative purposes only, and are not limiting. Alternate embodiments, differing slightly or substantially from those described herein, will be apparent to persons skilled in the relevant art based on the teachings contained herein. For example, one skilled in the relevant art will appreciate that the transcoding system and method of the present invention is not limited to the transcoding and delivery of media content alone, but also encompasses the transcoding and delivery of information of all types, including, but not limited to compressed files, electronic documents, HTML pages, XML documents, and any other information that can be stored in a plurality of formats and delivered electronically. Other alternate embodiments include, but are not limited to, hardware, software, and software/hardware implementations of the methods, systems, and components of the invention. Such alternate embodiments fall within the scope and spirit of the present invention.

Also, systems and methods for the on-demand transcoding of media content from a source type to a destination type may be provided, wherein the system includes a plurality of transcoders for transcoding from a plurality of source types to a plurality of destination types, and wherein the system receives a transcoding request for media content, fetches the media content in response to the transcoding request, sends the media content to one of the plurality of transcoders based on the source type and destination type, transcodes the media content from the source type to the destination type, thereby generating transcoded media content, and transmits the transcoded media content. The system may fetch, send, and transcode the media content and transmit the transcoded media content in a pipelined fashion. The system may also provide for the publication of media content as a file or stream of digital data, for the archiving of media content, and the caching of transcoded media content to improve system efficiency.

In addition, in methods that may be performed according to preferred embodiments herein and that may have been described above, the operations have been described in selected typographical sequences. However, the sequences have been selected and so ordered for typographical convenience and are not intended to imply any particular order for performing the operations.

H. CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for transcoding content from a source type to a destination type, comprising the steps of:
    fetching content;
    identifying a destination type;
    selecting one of a plurality of transcoders for transcoding from a source type to said destination type, wherein said one transcoder is selected based at least on said destination type;
    transcoding said content to said destination type, therein generating transcoded content; and
    transmitting said transcoded content.

2. The method of claim 1, wherein the content is fetched, sent and transcoded as a stream of digital data and said transcoded content is downloaded to a destination of the destination type.

3. The method of claim 1, wherein said content is fetched, sent and transcoded as a stream of digital data and said transcoded content is transmitted as a stream of digital data.

4. The method of claim 1, wherein content type is defined according to at least one publishing variable, wherein said at least one publishing variable includes:
    the file format of the content;
    the bit-rate of the content;
    the compression algorithm according to which the content is stored;
    the communication protocol according to which the content is transferred; or
    the physical medium on which the content is stored; or
    combinations thereof; and wherein said step of transcoding comprises converting said at least one publishing variable of the content from a source publishing variable type to a destination publishing variable type.

5. The method of claim 1, further comprising the steps of:
    storing said transcoded content in a transcoded cache; and
    responding to subsequent transcoding requests for the content by fetching said transcoded content from said transcoded cache, and transmitting said transcoded content.

6. The method of claim 5, further comprising the step of:
    determining whether to keep said transcoded content in said transcoded cache based on an intelligent algorithm.

7. A method for transcoding content from a source type to a destination type, comprising the steps of:
    receiving a request for content from a receiver;
    fetching said content;
    identifying a destination type corresponding to said receiver;
    selecting one of a plurality of transcoders for transcoding from a source type to said destination type, wherein said one transcoder is selected based at least on said destination type;
    transcoding said content to said destination type, therein generating transcoded content; and
    transmitting said transcoded content to said receiver.

8. A content transcoding device for transcoding content from a source type to a destination type, comprising:
    a fetching unit for fetching content;
    an identifying unit for identifying a destination type;
    a selecting unit for selecting one of a plurality of transcoders for transcoding from a source type to said destination type; wherein said one transcoder is selected based at least on said destination type;
    a transcoding unit for transcoding said content to said destination type, therein generating transcoded content; and
    a transmitting unit for transmitting said transcoded content.

9. A computer readable medium having a computer program for causing a computer to perform a method for transcoding content from a source type to a destination type, the method comprising the steps of:

fetching content;

identifying a destination type;

selecting one of a plurality of transcoders for transcoding from a source type to said destination type, wherein said one transcoder is selected based at least on said destination type;

transcoding said content to said destination type, therein generating transcoded content; and transmitting said transcoded content.

10. A transcoding device for transcoding content from a source type to a destination type, comprising:

a receiving unit configured to receive a request for content from a receiver;

a fetching unit configured to fetch said content;

an identifying unit configured to identify a destination type corresponding to said receiver;

a selecting unit configured to select one of a plurality of transcoders for transcoding from a source type to said destination type, wherein said one transcoder is selected based at least on said destination type;

a transcoding unit configured to transcode said content to said destination type, therein generating transcoded content; and a transmitting unit configured to transmit said transcoded content to said receiver.

11. The transcoding device of claim 10, wherein the content is fetched, sent and transcoded as a stream of digital data and said transcoded content is downloaded to a destination of the destination type.

12. The transcoding device of claim 10, wherein said content is fetched, sent and transcoded as a stream of digital data and said transcoded content is transmitted as a stream of digital data.

13. The transcoding device of claim 10, wherein content type is defined according to at least one publishing variable, wherein said at least one publishing variable includes:

the file format of the content;

the bit-rate of the content;

the compression algorithm according to which the content is stored;

the communication protocol according to which the content is transferred; or the physical medium on which the content is stored; or combinations thereof; and wherein said transcoding unit comprises a converting unit configured to convert said at least one publishing variable of the content from a source publishing variable type to a destination publishing variable type.

14. The transcoding device of claim 10, further comprising:

a store configured to store said transcoded content in a transcoded cache; and wherein said transmitting unit is configured to respond to subsequent transcoding requests for the content by fetching said transcoded content from said transcoded cache, and transmit said fetched transcoded content.

15. The transcoding device of claim 14, further comprising a determining unit configured to determine whether to keep said transcoded content in said transcoded cache based on an intelligent algorithm.

* * * * *